United States Patent
Harada et al.

(10) Patent No.: US 8,610,670 B2
(45) Date of Patent: Dec. 17, 2013

(54) IMAGING AND DISPLAY APPARATUS, INFORMATION INPUT APPARATUS, OBJECT DETECTION MEDIUM, AND OBJECT DETECTION METHOD

(75) Inventors: Tsutomu Harada, Kanagawa (JP); Takeru Tamayama, Kanagawa (JP); Kazunori Yamguchi, Kanagawa (JP); Mitsuru Tateuchi, Kanagawa (JP); Kouji Tsujimura, Tokyo (JP); Ryoichi Tsuzaki, Tokyo (JP)

(73) Assignee: Japan Display West Inc., Aichi-Ken (JP)

( * ) Notice: Subject to any disclaimer, the term of this patent is extended or adjusted under 35 U.S.C. 154(b) by 1480 days.

(21) Appl. No.: 11/842,727

(22) Filed: Aug. 21, 2007

(65) Prior Publication Data

US 2008/0055266 A1    Mar. 6, 2008

(30) Foreign Application Priority Data

Aug. 31, 2006  (JP) .................................. 2006-235106
Aug. 31, 2006  (JP) .................................. 2006-235107

(51) Int. Cl.
*G06F 3/041*  (2006.01)
*G09G 3/36*  (2006.01)

(52) U.S. Cl.
USPC ........................................... 345/173; 345/90

(58) Field of Classification Search
USPC ................................................ 345/156–178
See application file for complete search history.

(56) References Cited

U.S. PATENT DOCUMENTS

| 7,184,009 | B2 * | 2/2007 | Bergquist ........................ 345/90 |
| 7,190,336 | B2 | 3/2007 | Fujisawa |
| 2006/0170658 | A1 * | 8/2006 | Nakamura et al. ............ 345/173 |
| 2006/0238521 | A1 * | 10/2006 | Westerman et al. .......... 345/173 |

FOREIGN PATENT DOCUMENTS

| JP | 2004-127272 | 4/2004 |
| JP | 2004-318819 | 11/2004 |

* cited by examiner

*Primary Examiner* — Charles V Hicks
(74) *Attorney, Agent, or Firm* — K&L Gates LLP

(57) ABSTRACT

The imaging and display apparatus is provided. The imaging and display apparatus includes the following elements. An imaging-and-display panel has an image display function and an imaging function. A generation unit generates a difference image representing a difference between a display-light-based image and a shadow image, the display-light-based image being obtained by the imaging-and-display panel by imaging an object close to the imaging-and-display panel using display light from the imaging-and-display panel, the shadow image being obtained by the imaging-and-display panel by imaging a shadow of the object. An image processing unit obtains information concerning at least one of a position, shape, and size of the object taking the shadow image and the difference image into account.

20 Claims, 36 Drawing Sheets

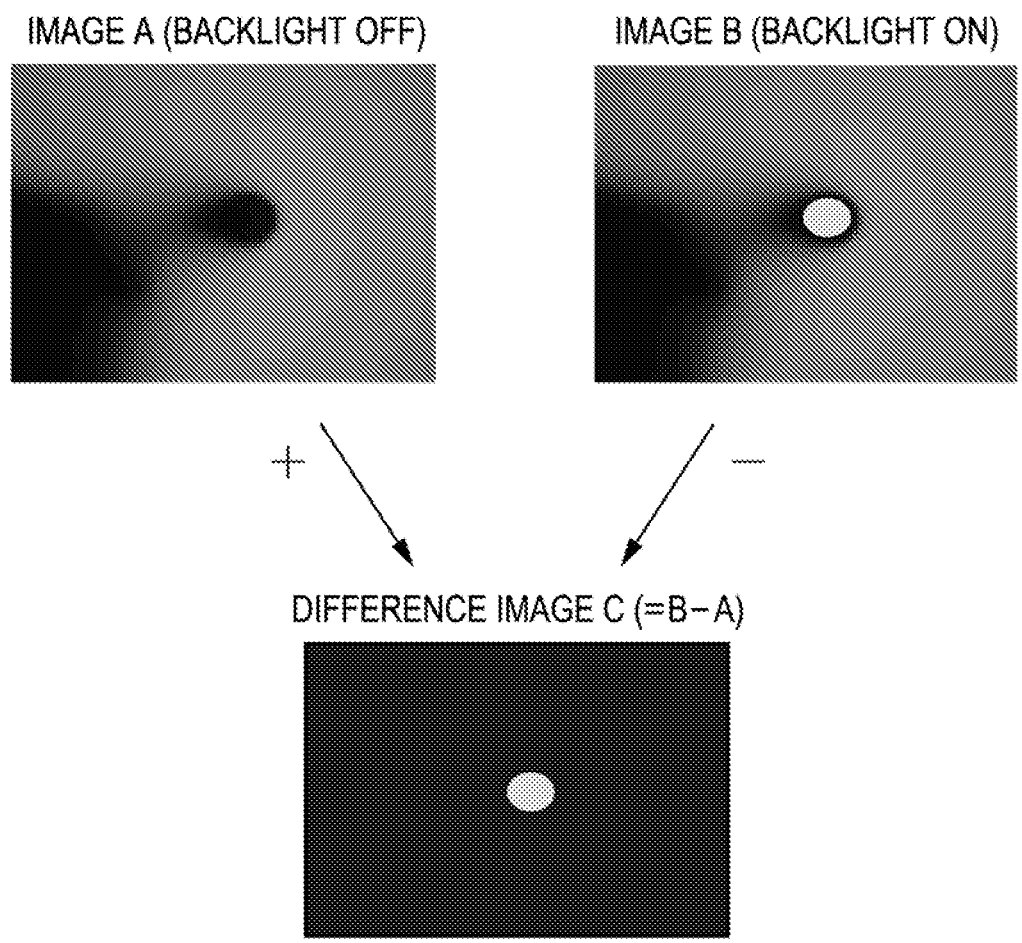

FIG. 22

| | DIFFERENCE-IMAGE FINGERTIP EXTRACTION PROCESS | SHADOW-IMAGE FINGERTIP EXTRACTION PROCESS |
|---|---|---|
| ENVIRONMENTAL CHANGES | ○ | △ (ACTIVE AT PREDETERMINED BRIGHTNESS OR MORE) |
| BACKLIGHT-OFF (UNDER SUNLIGHT) | × | ○ |
| DISPLAY FLEXIBILITY | △ (ACHIEVABLE BY DEFINING COLOR) | ○ |
| BLACK GLOBE | × | ○ (UNDER BRIGHT ENVIRONMENT) |
| 50-Hz FLUORESCENT LIGHTING | △ (IF DARK, OK) | △ (IF BRIGHT, OK) |
| SPOTLIGHT | ○ | △ (DEPENDING ON AMBIENT BRIGHTNESS) |
| SUNLIGHT FLASHING BETWEEN TREES | △ (LESS SUITABLE FOR MOTION: DEPENDING ON INTENSITY) | ○ (IF NOT SHARP, OK) |
| STYLUS | △ (LIGHT-REFLECTING BALL POINT PEN, SPECIFYING DISPLAY COLOR) | △ (DETECTION ALGORITHM IS NECESSARY) |

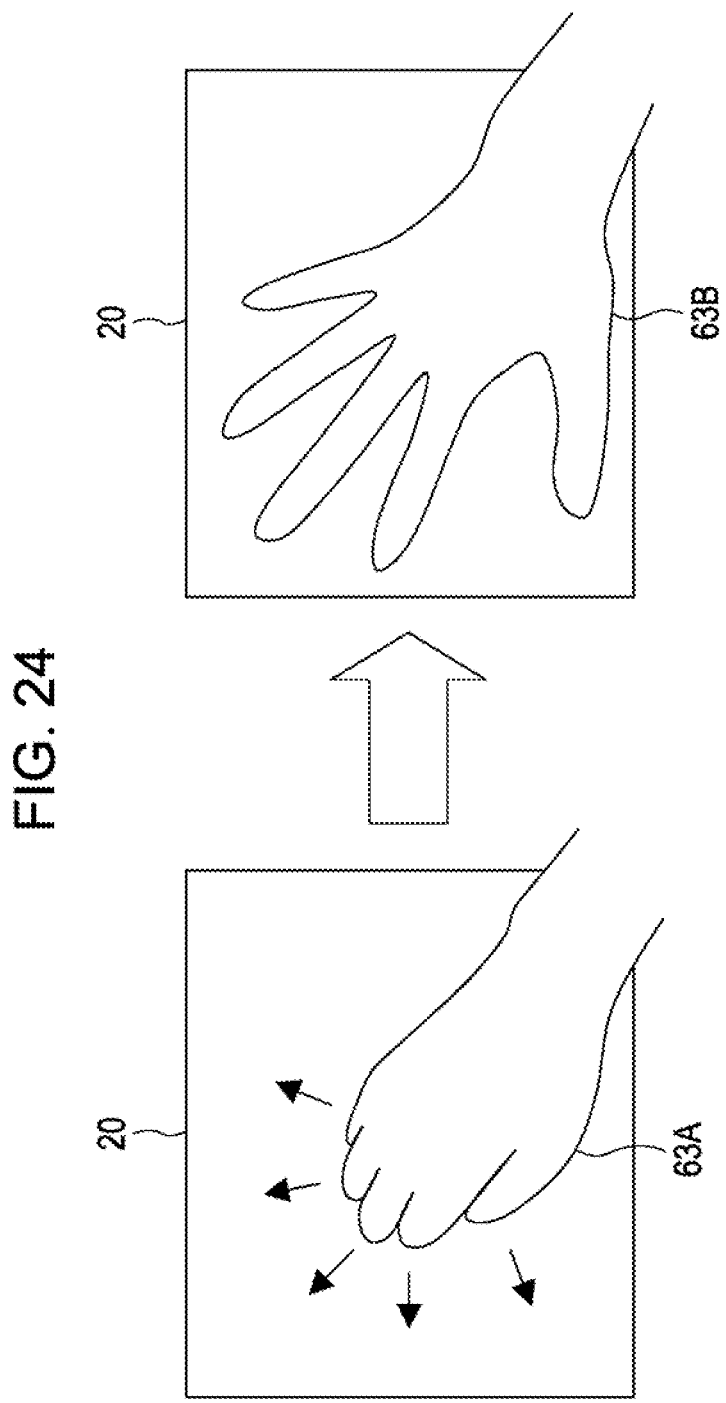

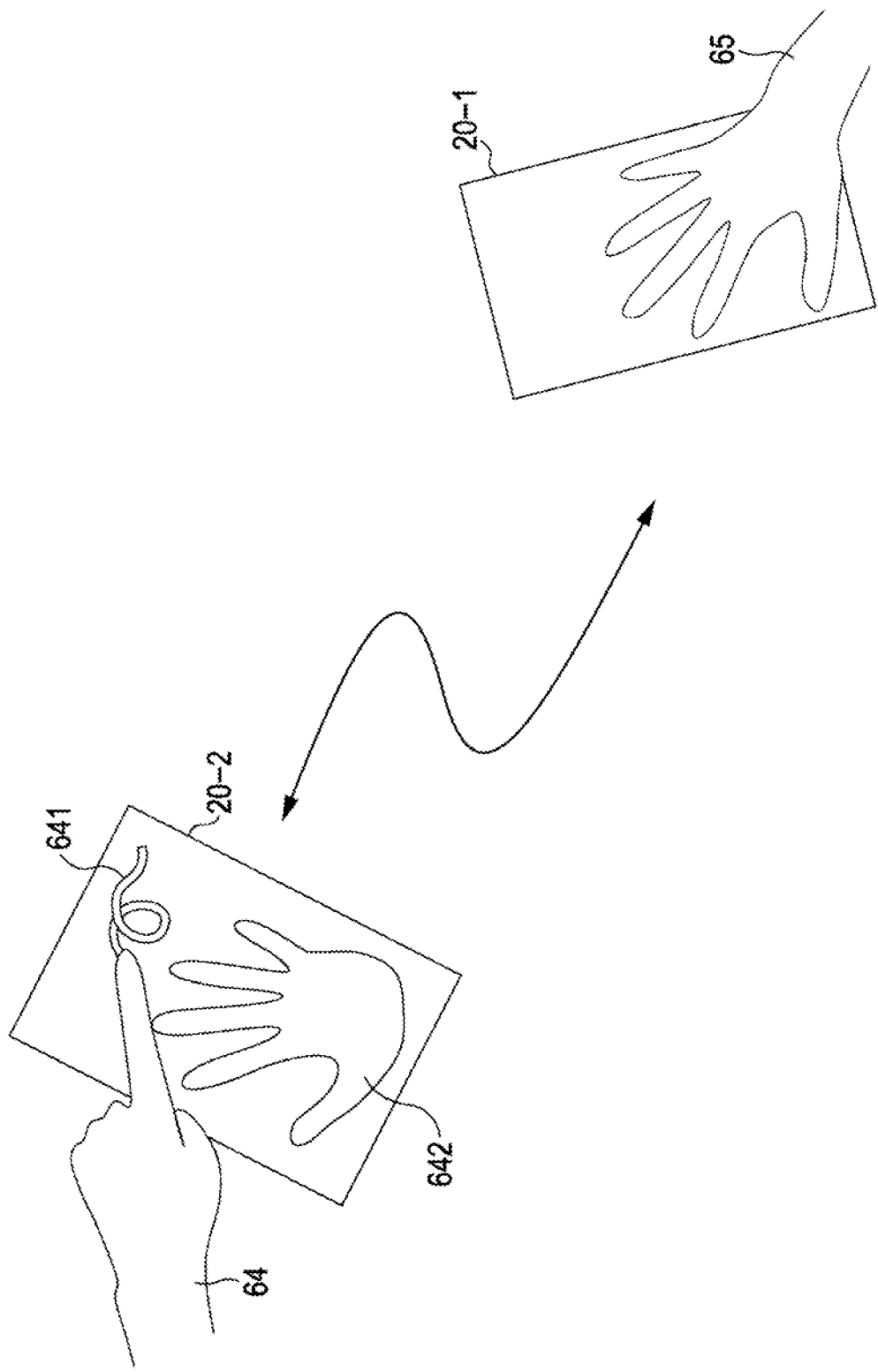

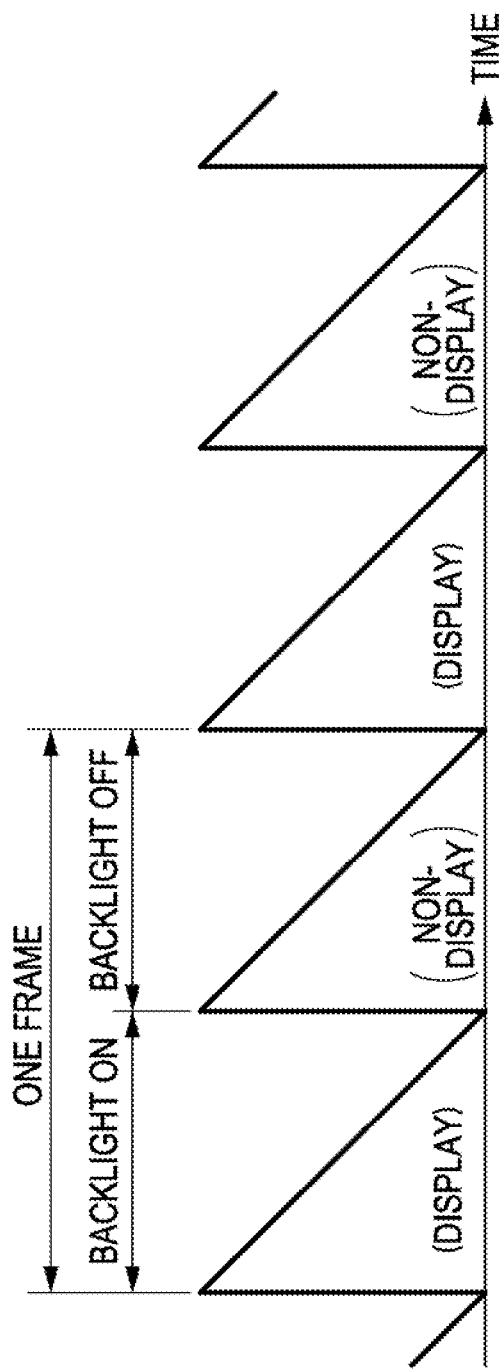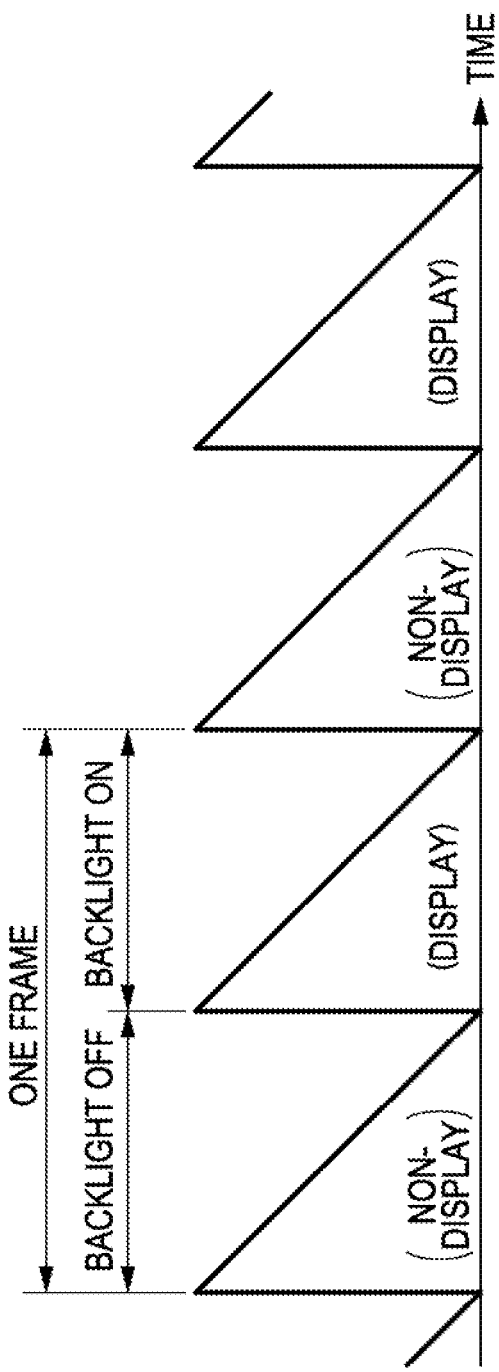
FIG. 30A
FIG. 30B

IMAGING AND DISPLAY APPARATUS, INFORMATION INPUT APPARATUS, OBJECT DETECTION MEDIUM, AND OBJECT DETECTION METHOD

CROSS REFERENCES TO RELATED APPLICATIONS

The present application claim priority to Japanese Patent Application JP 2006-235106 filed in the Japanese Patent Office on Aug. 31, 2006 and Japanese Patent Application JP 2006-235107 filed in the Japanese Patent Office on Aug. 31, 2006, the entire contents of which are incorporated herein by reference.

BACKGROUND

The present application relates to an imaging and display apparatus and an information input apparatus for obtaining information such as the position of an object touching or in close proximity to a display panel, and an object detection medium and method for obtaining such information.

In the art, techniques for detecting the position or the like of an object touching or in close proximity to a display surface of a display apparatus have been known. One typical well-known technique is a display apparatus having a touch panel.

There are various types of touch panels, and one well-known type of touch panel is the type that detects an electro-static capacitance. This type of touch panel is designed such that a change in electric charge on a surface of the touch panel caused by touching the touch panel with an object such as a finger is detected to determine the position or the like of the object. A user can use such a touch panel to perform an intuitive operation.

For example, the assignee of the present application has proposed, in Japanese Unexamined Patent Application Publication No. 2004-127272, a display apparatus including a display unit (i.e., an imaging-and-display panel) having a display function for displaying an image and an imaging function (or detection function) for imaging (or detecting) an object.

The display apparatus disclosed in Japanese Unexamined Patent Application Publication No. 2004-127272 allows detection of the position or the like of an object touching or in close proximity to the imaging-and-display panel, such as a finger, using display light reflected from the object on the basis of a captured image. With the use of the display apparatus, therefore, the position or the like of an object can be detected with a simple structure without using any additional component such as a touch panel on the imaging-and-display panel.

In the above-described structure in which display light reflected from an object is used, however, there is a problem involving the brightness of the display light. Specifically, the brightness of the display light affects the brightness of received light, and the brightness of the display light varies in accordance with image data. Therefore, for example, when black display is provided or when a backlight in a transflective liquid crystal display apparatus is continuously turned off (e.g., when the liquid crystal display apparatus is used outdoor), it is difficult to detect the position or the like of an object on the basis of a captured image.

Accordingly, in the related art, it is difficult to accurately detect an object touching or in close proximity to a display panel regardless of the current use condition such as the brightness of display light.

SUMMARY

It is therefore desirable to an image display apparatus and an object detection method in which an object can be detected regardless of the use condition.

According to an embodiment, there is provided an imaging and display apparatus including the following elements. An imaging-and-display panel has an image display function and an imaging function. Generating means generates a difference image representing a difference between a display-light-based image and a shadow image, the display-light-based image being obtained by the imaging-and-display panel by imaging an object close to the imaging-and-display panel using display light from the imaging-and-display panel, the shadow image being obtained by the imaging-and-display panel by imaging a shadow of the object. Image processing means obtains information concerning at least one of a position, shape, and size of the object taking the shadow image and the difference image into account. The term "object close to the imaging-and-display panel" means an object including an object in close proximity to the imaging-and-display panel and an object touching the imaging-and-display panel. The term "shadow image" means an image obtained by imaging a shadow using external light, i.e., an image obtained without using display light.

According to another embodiment, there is provided an object detection medium allowing a computer to execute a first imaging step of, by an imaging-and-display panel having an image display function and an imaging function, imaging a shadow of an object close to the imaging-and-display panel; a second imaging step of, by the imaging-and-display panel, imaging the object using display light from the imaging-and-display panel; an image generating step of generating a difference image representing a difference between a display-light-based image obtained in the second imaging step and a shadow image obtained in the first imaging step; and a detecting step of detecting information concerning at least one of a position, shape, and size of the object taking the shadow image and the difference image into account.

According to still another embodiment, there is provided an object detection method including the steps of, by an imaging-and-display panel having an image display function and an imaging function, imaging a shadow of an object close to the imaging-and-display panel; by the imaging-and-display panel, imaging the object using display light from the imaging-and-display panel; generating a difference image representing a difference between a display-light-based image obtained by imaging the object using the display light and a shadow image obtained by imaging the shadow of the object; and detecting information concerning at least one of a position, shape, and size of the object taking the shadow image and the difference image into account.

In the imaging and display apparatus, the object detection medium, and the object detection method according to the embodiments, therefore, a shadow image is obtained by the imaging-and-display panel by imaging a shadow of an object close to the imaging-and-display panel. A display-light-based image is obtained by the imaging-and-display panel using display light emitted from the imaging-and-display panel. A difference image representing a difference between the display-light-based image and the shadow image is generated, and information concerning at least one of a position, shape, and size of the object is detected taking the difference image and the shadow image into account.

According to the imaging and display apparatus, the object detection medium, or the object detection method according to the embodiment, a difference image representing a difference between a display-light-based image obtained by imaging an object close to the imaging-and-display panel using display light and a shadow image obtained by imaging a shadow of the object is generated, and information concerning at least one of a position, shape, and size of the object is detected taking the shadow image and the difference image into account. Therefore, the object can be detected regardless of the environmental condition or the current use condition such as the brightness of display light.

According to still another embodiment, there is provided an imaging and display apparatus including an imaging-and-display panel having an image display function and an imaging function; and image processing means for obtaining information concerning at least one of a position, shape, and size of an object close to the imaging-and-display panel on the basis of a shadow image obtained by the imaging-and-display panel by imaging a shadow of the object. The object close to the imaging-and-display panel is an object including an object in close proximity to the imaging-and-display panel and an object touching the imaging-and-display panel. The shadow image is an image obtained by imaging a shadow using external light, i.e., an image obtained without using display light from the imaging-and-display panel.

According to still another embodiment, there is provided an object detection medium allowing a computer to execute an imaging step of, by an imaging-and-display panel having an image display function and an imaging function, imaging a shadow of an object close to the imaging-and-display panel; and a detecting step of detecting information concerning at least one of a position, shape, and size of the object on the basis of a shadow image obtained in the imaging step.

According to still another embodiment, there is provided an object detection method including the steps of, by an imaging-and-display panel having an image display function and an imaging function, imaging a shadow of an object close to the imaging-and-display panel; and detecting information concerning at least one of a position, shape, and size of the object on the basis of a shadow image obtained by imaging the shadow of the object.

In the imaging and display apparatus, the object detection medium, and the object detection method according to the embodiments, therefore, a shadow image is obtained by the imaging-and-display panel by imaging a shadow of an object close to the imaging-and-display panel. Based on the shadow image, information concerning at least one of a position, shape, and size of the object is detected.

According to still another embodiment, there is provided an information input apparatus including an imaging panel having an imaging function; and image processing means for obtaining information concerning at least one of a position, shape, and size of an object close to the imaging panel on the basis of a shadow image obtained by the imaging panel by imaging a shadow of the object.

In the information input apparatus according to the embodiment, therefore, a shadow image is obtained by the imaging panel by imaging a shadow of an object close to the imaging-and-display panel. Based on the shadow image, information concerning at least one of a position, shape, and size of the object is detected.

According to the imaging and display apparatus, the information input apparatus, the object detection medium, or the object detection method according to the embodiment, information concerning at least one of a position, shape, and size of an object close to the imaging-and-display panel is detected on the basis of a shadow image obtained by imaging a shadow of the object. Therefore, the object can be detected regardless of the current use condition such as the brightness of display light.

Additional features and advantages are described herein, and will be apparent from, the following Detailed Description and the figures.

BRIEF DESCRIPTION OF THE FIGURES

FIG. 9 is a photographic diagram showing the difference-image fingertip extraction process;

FIG. 22 is a diagram showing the comparison between the difference-image fingertip extraction process and the shadow-image fingertip extraction process;

FIG. 24 is a diagram showing an example application using a result of a fingertip extraction process;

FIG. 25 is a diagram showing an example application using a result of a fingertip extraction process;

FIGS. 30A and 30B are timing charts showing the relationship between the on-off state of a backlight and the display state of an imaging and display apparatus according to a fourth embodiment;

DETAILED DESCRIPTION

Embodiments of the present application will be described in detail hereinafter with reference to the drawings.

Figure 1:
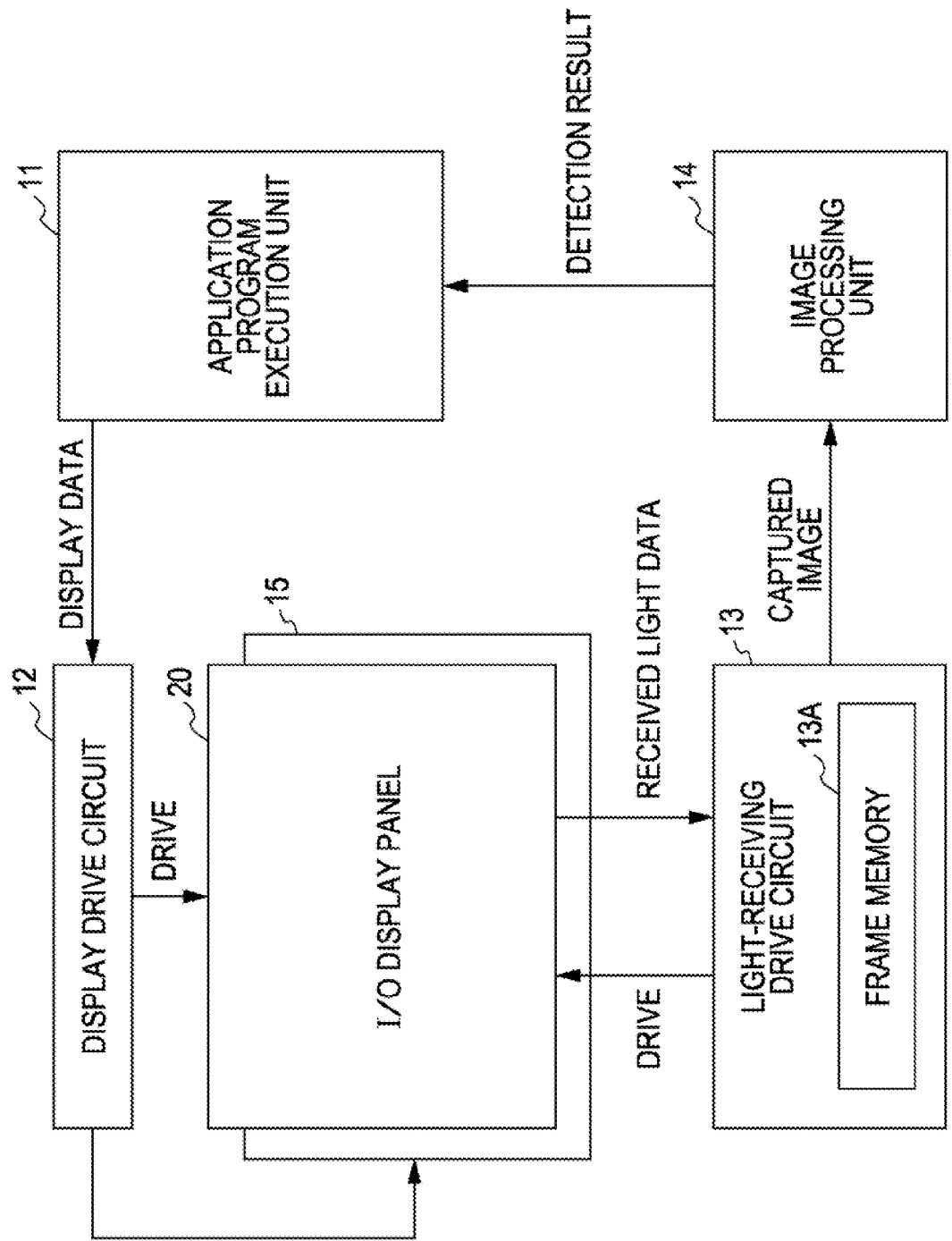
FIG. 1 is a block diagram showing the structure of an imaging and display apparatus according to a first embodiment.

FIG. 1 shows the overall structure of an imaging and display apparatus according to a first embodiment. The imaging and display apparatus includes an input/output (I/O) display panel 20, a backlight 15, a display drive circuit 12, a light-receiving drive circuit 13, an image processing unit 14, and an application program execution unit 11.

The I/O display panel 20 is formed of a liquid crystal display (LCD) panel having a plurality of pixels arranged in a matrix over the entire surface thereof. The I/O display panel 20 has a function (display function) for displaying a predetermined image based on display data, such as a graphic image or text, while performing a line-sequential operation, and a function (imaging function) for imaging an object touching or in close proximity to the I/O display panel 20, as described below. The backlight 15 is a light source of the I/O display panel 20, including, for example, a plurality of light-emitting diodes. As described below, the backlight 15 is rapidly turned on and off at predetermined intervals synchronized with operation timings of the I/O display panel 20.

The display drive circuit 12 drives the I/O display panel 20 (i.e., line-sequential driving) to display an image based on display data (that is, to perform a display operation).

The light-receiving drive circuit 13 drives the I/O display panel 20 (i.e., line-sequential driving) to obtain incoming light data (that is, to image an object). For example, light data received from the pixels is stored in a frame memory 13A on a frame-by-frame basis, and is output as a captured image to the image processing unit 14.

The image processing unit 14 performs a predetermined image processing (calculation) operation on the basis of the captured image output from the light-receiving drive circuit 13 to detect and obtain information relating to an object touching or in close proximity to the I/O display panel 20 (e.g., position coordinate data, data relating to the shape or size of the object, etc.). The detection process is described in detail below.

The application program execution unit 11 executes a process in accordance with predetermined application software on the basis of a detection result of the image processing unit 14. For example, the detected position coordinates of the object are included in display data and an image based on the display data is displayed on the I/O display panel 20. The display data generated by the application program execution unit 11 is supplied to the display drive circuit 12.

Figure 2:
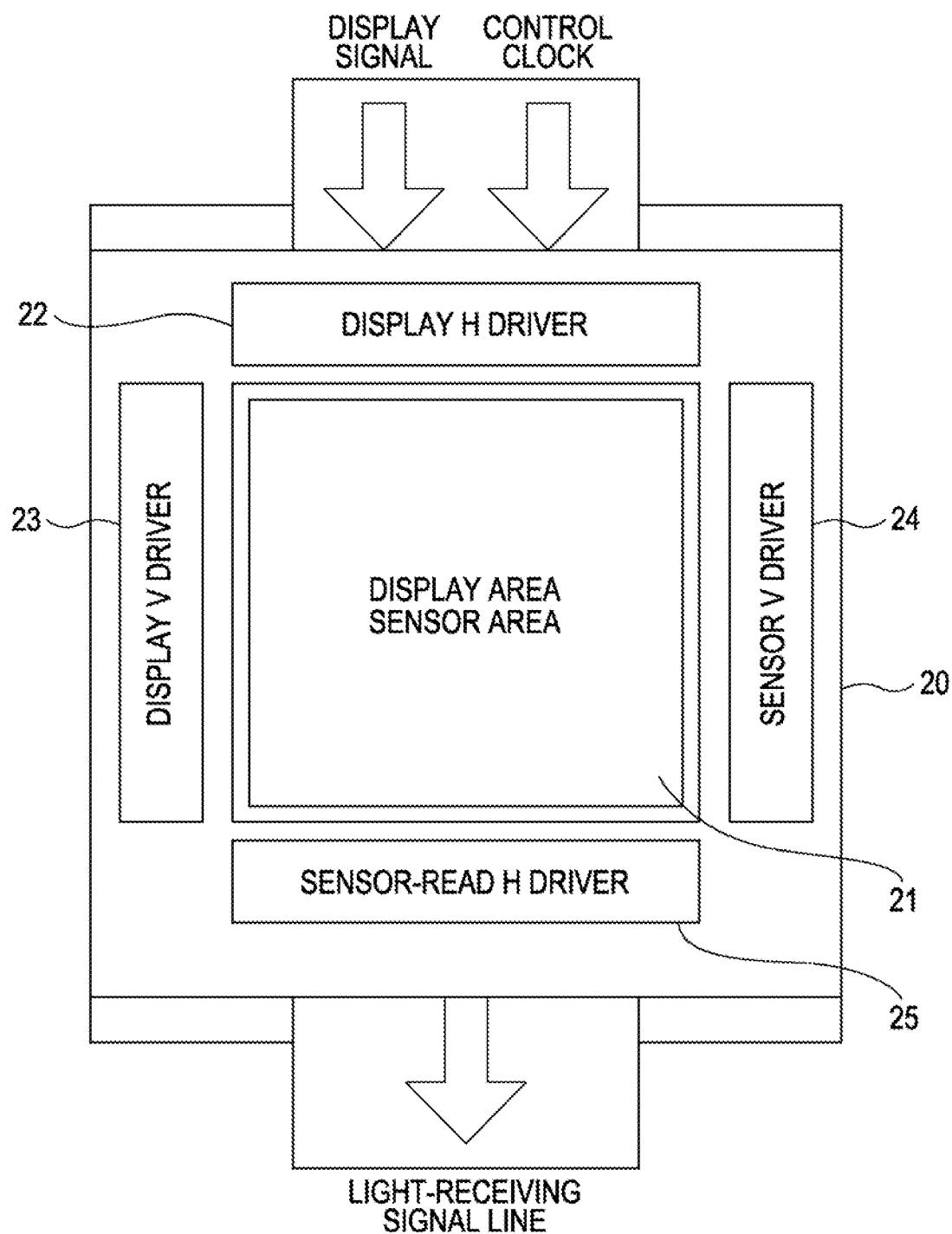
FIG. 2 is a block diagram showing an example structure of an I/O display panel in the imaging and display apparatus shown in FIG. 1.

An example structure of the I/O display panel 20 will now be described in detail with reference to FIG. 2. The I/O display panel 20 includes a display area (sensor area) 21, a display H driver 22, a display V driver 23, a sensor-read H driver 25, and a sensor V driver 24.

The display area (sensor area) 21 is an area for modulating light from the backlight 15 to emit display light and imaging an object touching or in close proximity to the display area 21. In the display area 21, liquid crystal elements serving as light-emitting elements (display elements) and light-receiving elements (imaging elements), described below, are arranged in a matrix.

The display H driver 22 and the display V driver 23 line-sequentially drive liquid crystal elements of pixels in the display area 21 on the basis of a display signal for driving the display and a control clock supplied from the display drive circuit 12.

The sensor-read H driver 25 and the sensor V driver 24 line-sequentially drive light-receiving elements of the pixels in the sensor area 21, and obtain incoming light signals.

Figure 3:
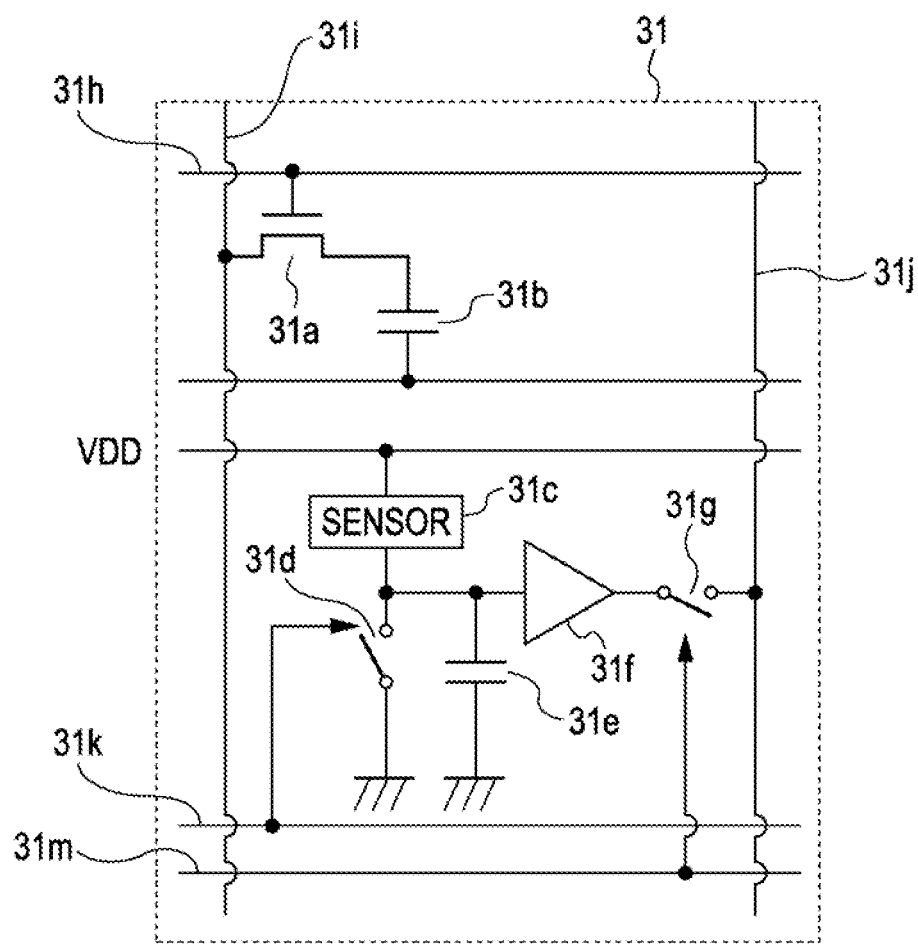
FIG. 3 is a circuit diagram showing an example structure of each pixel.

An example structure of each of the pixels in the display area 21 will now be described in detail with reference to FIG. 3. Referring to FIG. 3, a pixel 31 includes a liquid crystal element serving as a display element, and a light-receiving element.

Specifically, in the display element, a switching element 31a formed of a thin-film transistor (TFT) or the like is arranged at an intersection of a gate electrode 31h extending in the horizontal direction and a drain electrode 31i extending in the vertical direction, and a pixel electrode 31b including a liquid crystal is arranged between the switching element 31a and a counter electrode. The switching element 31a is turned on or off according to a drive signal supplied via the gate electrode 31h. When the switching element 31a is turned on, a pixel voltage is applied to the pixel electrode 31b according to a display signal supplied via the drain electrode 31i.

The light-receiving element adjacent to the display element includes a light-receiving sensor 31c formed of, for example, a photodiode or the like, and a power supply voltage VDD is supplied to the light-receiving sensor 31c. The light-receiving sensor 31c is connected to a reset switch 31d and a capacitor 31e so that the light-receiving sensor 31c is reset by the reset switch 31d and an electric charge corresponding to the amount of received light is stored in the capacitor 31e. When a read switch 31g is turned on, the stored electric charge is supplied to a signal-output electrode 31j via a buffer amplifier 31f, and is output to the outside. The on-off operation of the reset switch 31d is controlled by a signal supplied from a reset electrode 31k, and the on-off operation of the read switch 31g is controlled by a signal supplied from a read control electrode 31m.

Figure 4:
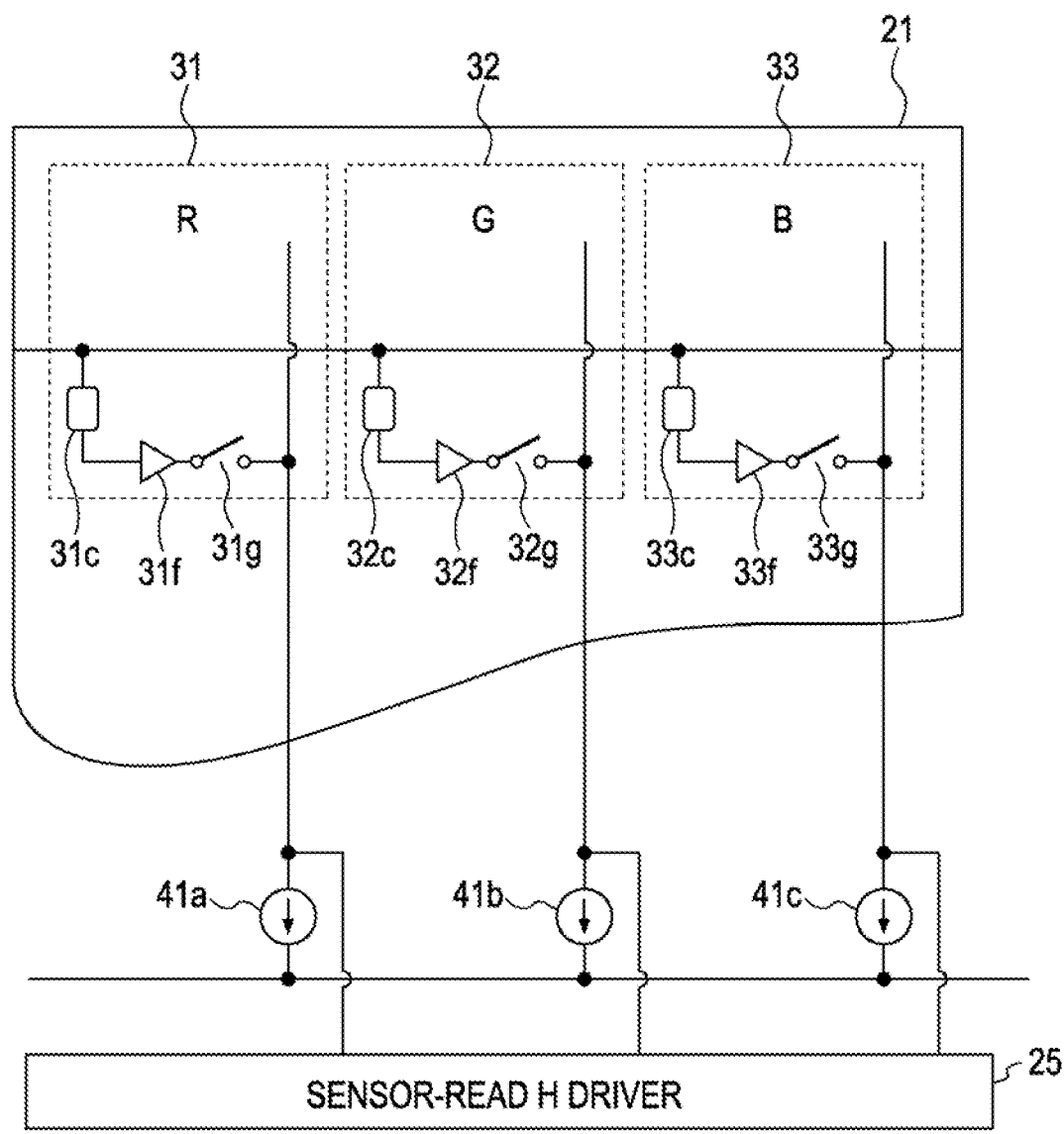
FIG. 4 is a circuit diagram showing the connection relationship between pixels and a sensor-read H driver.

The connection relationship between the pixels in the display area 21 and the sensor-read H driver 25 will now be described with reference to FIG. 4. In the display area 21, a red (R) pixel 31, a green (G) pixel 32, and a blue (B) pixel 33 are arranged side-by-side.

Electric charges stored in capacitors connected to light-receiving sensors 31c, 32c, and 33c of the pixels 31, 32, and 33 are amplified by buffer amplifiers 31f, 32f, and 33f, respectively, and are supplied to the sensor-read H driver 25 via signal-output electrodes when read switches 31g, 32g, and 33g are turned on, respectively. The signal-output electrodes are connected to constant-current sources 41a, 41b, and 41c, and the sensor-read H driver 25 detects signals corresponding to the amount of received light with high sensitivity.

The operation of the imaging and display apparatus of the first embodiment will now be described in detail.

First, the basic operation of the imaging and display apparatus, i.e., the operation for displaying an image and the operation for imaging an object, will be described.

In the imaging and display apparatus, a drive signal for display is generated by the display drive circuit 12 on the basis of the display data supplied from the application program execution unit 11, and the I/O display panel 20 is driven by the drive signal to perform a line-sequential display operation to display an image. The backlight 15 is also driven by the display drive circuit 12 to turn on or off in synchronization with the operation of the I/O display panel 20.

Figure 5:
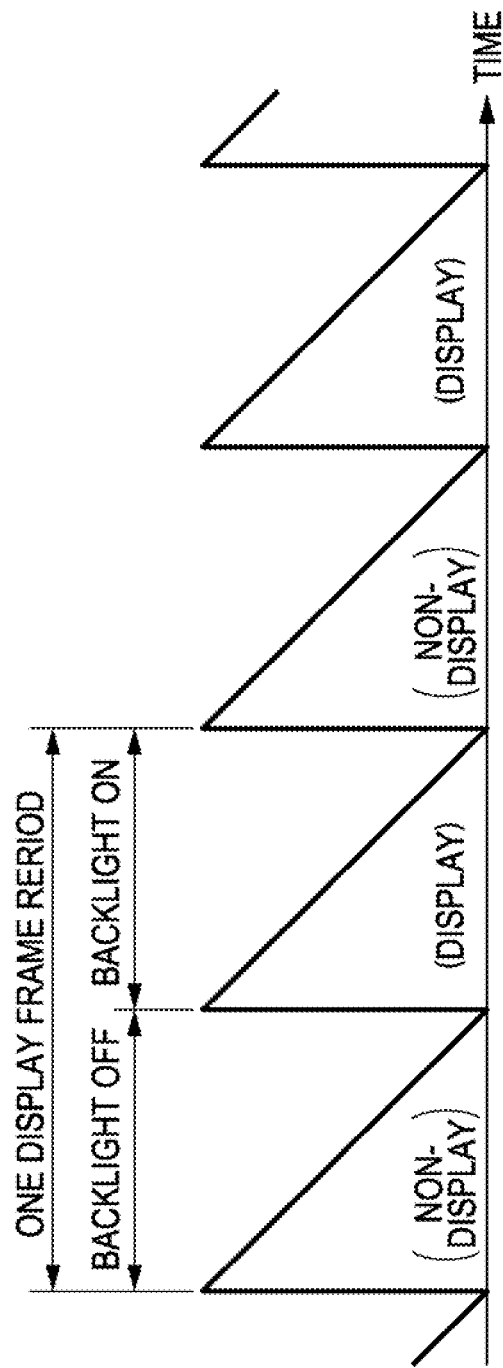
FIG. 5 is a timing chart showing the relationship between the on-off state of a backlight and the display state.

The relationship between the on-off state of the backlight 15 and the display state of the I/O display panel 20 will now be described with reference to FIG. 5.

For example, an image is displayed for a frame period of 1/60 seconds. In this case, the backlight 15 is not illuminated (or turned off) in the first half period (1/120 seconds) of each frame period, and no image is displayed. In the second half period of each frame period, on the other hand, the backlight 15 is illuminated (or turned on), and a display signal is supplied to each of the pixels to display an image for the corresponding frame period.

Accordingly, the first half period of each frame period is a non-light-emission period during which no display light is emitted from the I/O display panel 20, and the second half period of each frame period is a light-emission period during which display light is emitted from the I/O display panel 20.

When an object (e.g., a fingertip) touches or comes in close proximity to the I/O display panel 20, the light-receiving drive circuit 13 performs line-sequential light-receiving driving to image the object using the light-receiving elements of the pixels in the I/O display panel 20, and the light signals received from the light-receiving elements are supplied to the light-receiving drive circuit 13. In the light-receiving drive circuit 13, light signals received from the pixels for one frame are stored and are output as a captured image to the image processing unit 14.

The image processing unit 14 performs a predetermined image processing (calculation) operation, as described below, on the basis of the captured image to detect information relating to the object touching or in close proximity to the I/O display panel 20 (e.g., position coordinate data, data relating to the shape or size of the object, etc.).

Figure 6:
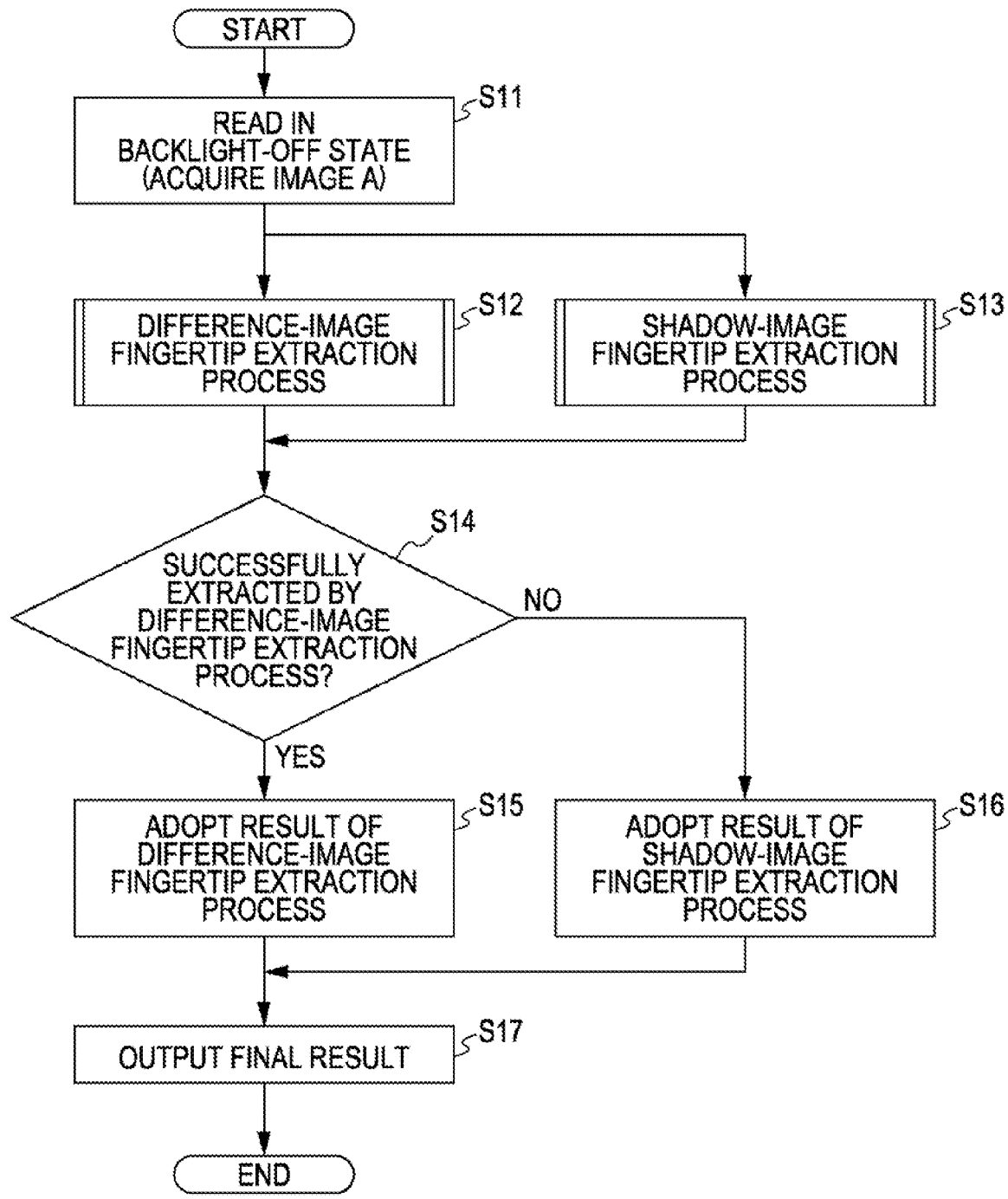
FIG. 6 is a flowchart showing a fingertip extraction process according to the first embodiment.

Next, an extraction process (fingertip extraction process) of an object (hereinafter also referred to as a "close object"), such as a fingertip, touching or in close proximity to the I/O display panel 20 performed by the image processing unit 14, which is a feature of the first embodiment, will be described in detail with reference to FIGS. 6 to 22. FIG. 6 is a flowchart showing a fingertip extraction process performed by the image processing unit 14, and FIG. 7 is a timing chart showing a portion of the fingertip extraction process.

Figure 7:
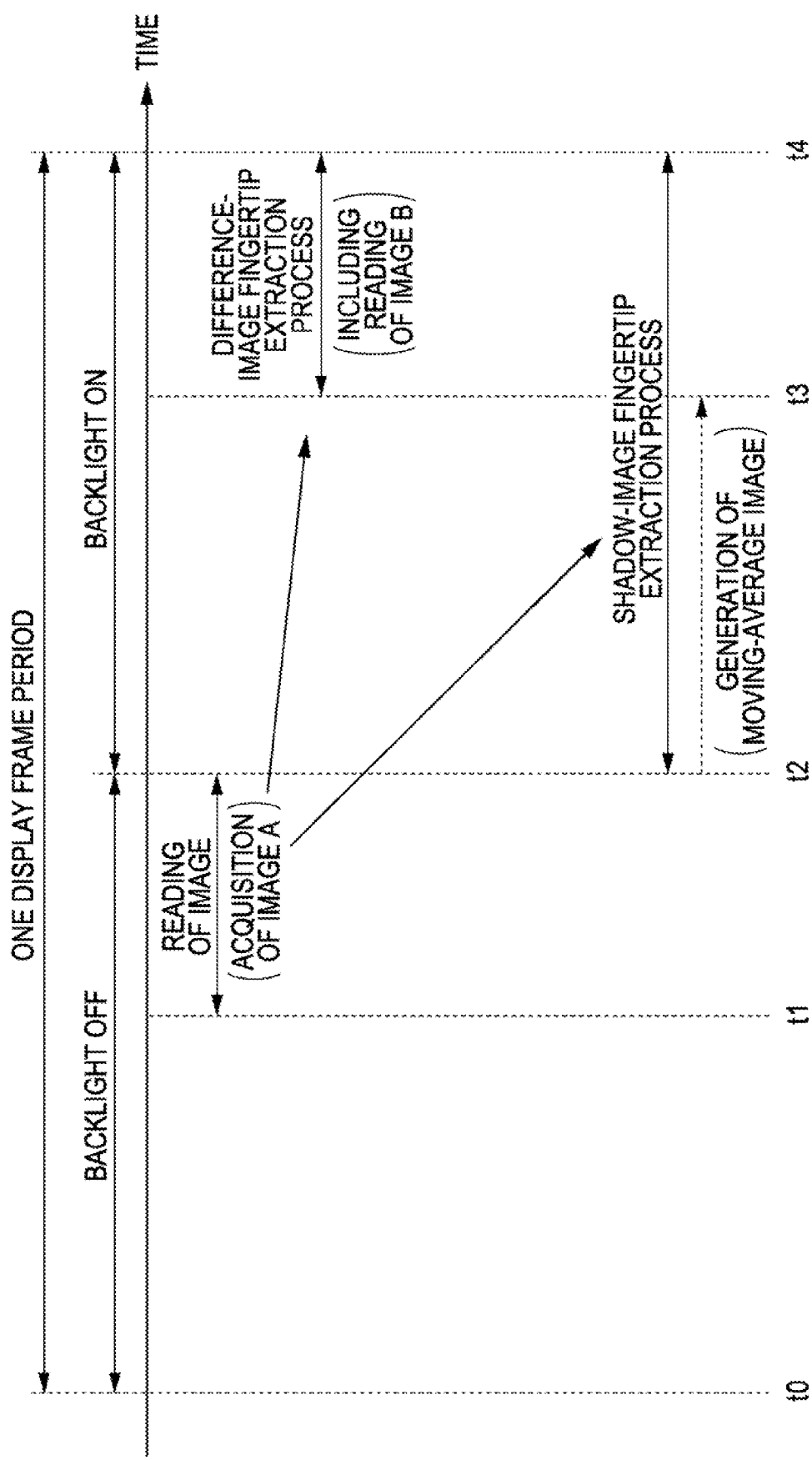
FIG. 7 is a timing chart showing the extraction process shown in FIG. 6.

First, in the first half period of one display frame period during which the backlight 15 is turned off (non-light-emission period), the I/O display panel 20 images the close object, and acquires an image A (shadow image) (step S11 shown in FIG. 6) (see also FIG. 7).

Then, in the second half period of the one display frame period during which the backlight 15 is turned on (light-emission period), the I/O display panel 20 images the close object, and acquires an image B (display-light-based image) (see also FIG. 7). Then, the image processing unit 14 performs a fingertip extraction process (difference-image fingertip extraction process) based on a difference image C representing a difference between the image B and the image A (step S12).

In parallel to this difference-image fingertip extraction process, a fingertip extraction process (shadow-image fingertip extraction process) based on the image A (shadow image) is performed by the image processing unit 14 (step S13) (see also FIG. 7).

Then, the image processing unit 14 determines whether or not the fingertip has been successfully extracted by the difference-image fingertip extraction process in step S12 (that is, whether or not information such as the position, shape, or size of the close object such as a fingertip has been obtained) (step S14). If it is determined that the fingertip has been successfully extracted ("YES" in step S14), the image processing unit 14 determines that the extraction result of the difference-image fingertip extraction process is adopted (step S15), and outputs a final result to the application program execution unit 11 (step S17).

If it is determined that the fingertip has not been successfully extracted ("NO" in step S14), the image processing unit 14 determines that the extraction result of the shadow-image fingertip extraction process is adopted (step S16), and outputs a final result to the application program execution unit 11 (step S17).

Therefore, the difference-image fingertip extraction process is used as a primary process and the shadow-image fingertip extraction process is used as a secondary process, and an extraction result of either extraction process is finally selected by taking both extraction processes into account.

The difference-image fingertip extraction process and the shadow-image fingertip extraction process will be described in detail.

Figure 8:
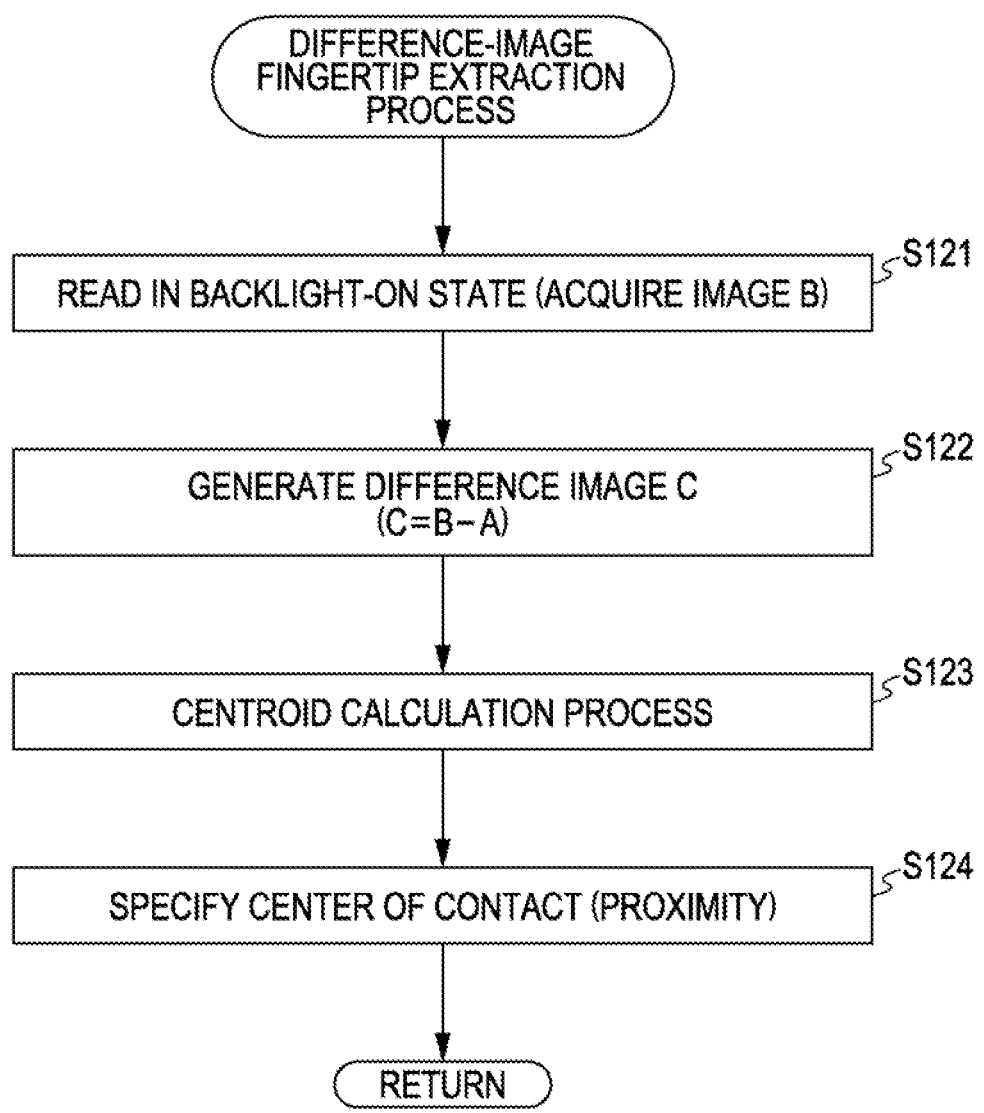
FIG. 8 is a flowchart showing the details of a difference-image fingertip extraction process shown in FIG. 7.

First, the difference-image fingertip extraction process will be described in detail with reference to FIGS. 8 to 13. FIG. 8 is a flowchart showing the details of the difference-image fingertip extraction process.

As described above, first, in the second half of one display frame period during which the backlight 15 is turned on (light-emission period), the I/O display panel 20 images the close object, and acquires an image B (display-light-based image) (step S121 shown in FIG. 8) (see also FIG. 7).

Then, the image processing unit 14 generates a difference image C representing a difference between the image B and an image A (shadow image) obtained by an imaging operation performed in the period during which the backlight 15 is turned off (non-light-emission period) (step S122).

Then, the image processing unit 14 performs a calculation operation to determine the centroid of the generated difference image (step S123), and specifies the center of contact (or proximity) of the difference image (step S124).

In the difference-image fingertip extraction process, therefore, a fingertip extraction process is performed on the basis of a difference image C representing a difference between an image B obtained using display light and an image A obtained using external light without using display light. As in an example of a photographic image of the difference image C shown in FIG. 9, the influence of the intensity of external light is reduced or eliminated, and the close object is detected without any influence of the intensity of external light.

Figure 10A:
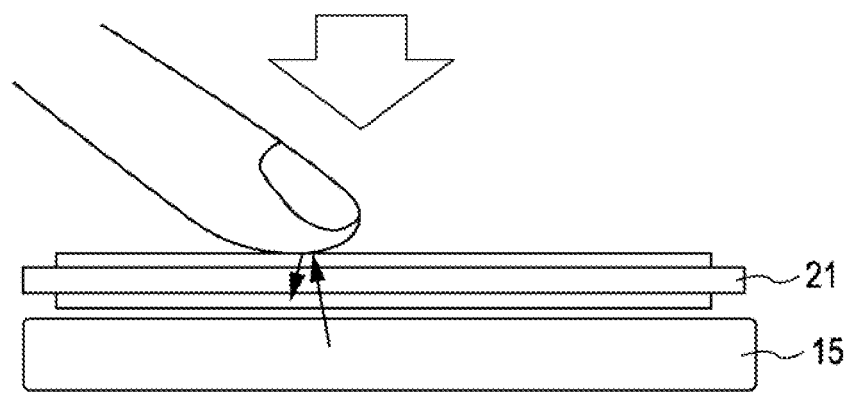
FIGS. 10A and 10B are diagrams showing the difference-image fingertip extraction process when the intensity of external light is high.
Figure 10B:
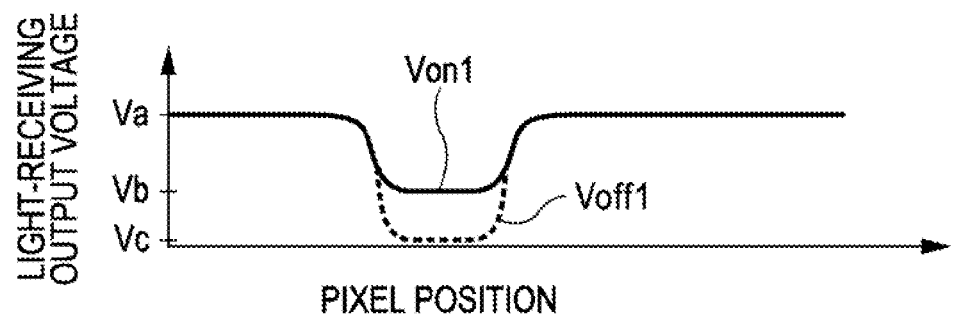

Specifically, as shown in a cross-sectional view of FIG. 10A, for example, when the intensity of incident external light is high, under illumination of the backlight 15, as shown in FIG. 10B, a light-receiving output voltage Von1 in a non-contact portion other than a finger-contact portion has a voltage value Va, and the light-receiving output voltage Von1 in the finger-contact portion has a low-level voltage Vb. The voltage value Va corresponds to the intensity of the external light, and the voltage Vb corresponds to the reflectance with which the light from the backlight 15 is reflected from the surface of the touching object (e.g., finger). On the other hand, under non-illumination of the backlight 15, a light-receiving output voltage Voff1 in the non-contact portion other than the finger-contact portion also has the voltage value Va corresponding to the intensity of the external light, and the light-receiving output voltage Voff1 in the finger-contact portion has a lower-level voltage value Vc because the external light is blocked.

Figure 11A:
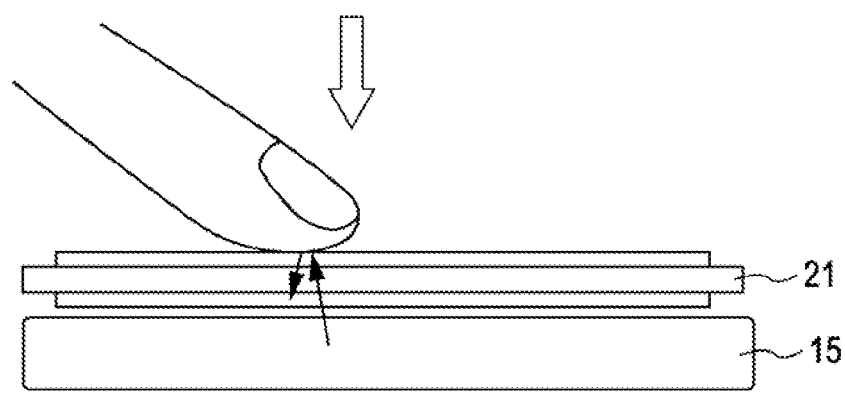
FIGS. 11A and 11B are diagrams showing the difference-image fingertip extraction process when the intensity of external light is low.
Figure 11B:
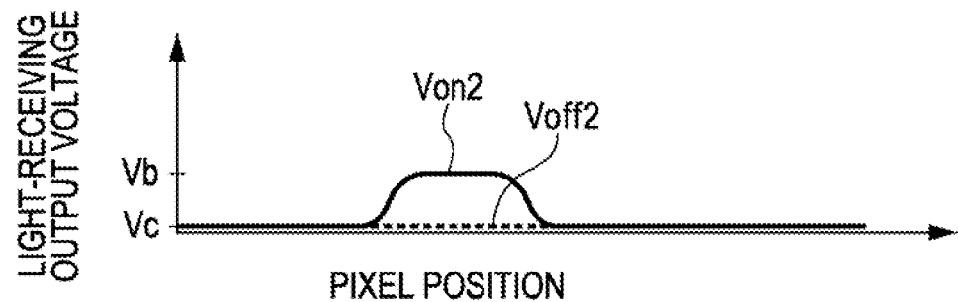

As shown in cross-sectional view of FIG. 11A, when the intensity of incident external light is low (substantially zero), under illumination of the backlight 15, as shown in FIG. 11B, a light-receiving output voltage Von2 in a non-contact portion other than a finger-contact portion has a low-level voltage value Vc because no external light enters, and the light-receiving output voltage Von2 in the finger-contact portion has a higher-level voltage value Vb. The voltage value Vb corresponds to the reflectance with which the light from the backlight 15 is reflected from the surface of the touching object (e.g., finger). On the other hand, under non-illumination of the backlight 15, a light-receiving output voltage Voff2 in both the finger-contact portion and the remaining portion is kept at the low-level voltage value Vc.

As can be seen from the comparison between FIGS. 10A and 11A and between FIGS. 10B and 11B, the light-receiving output voltage in the non-contact portion in the display area 21 of the I/O display panel 20 is largely different between the external light condition and the non-external light condition. In the finger-contact portion, however, the voltage value Vb obtained under illumination of the backlight 15 and the voltage value Vc obtained under non-illumination of the backlight 15 are low in level regardless of whether or not external light is present.

Therefore, the difference between the voltage value obtained under illumination of the backlight 15 and the voltage value obtained under non-illumination of the backlight 15 is detected, and a portion whose difference between the voltage values is not less than a predetermined value, such as the difference between the voltage values Vb and Vc, is determined as the portion where the object touches or comes in close proximity. Consequently, touch or proximity can be uniformly detected with high accuracy regardless of whether the intensity of the external light incident on the I/O display panel 20 is high or zero.

Figure 12A:
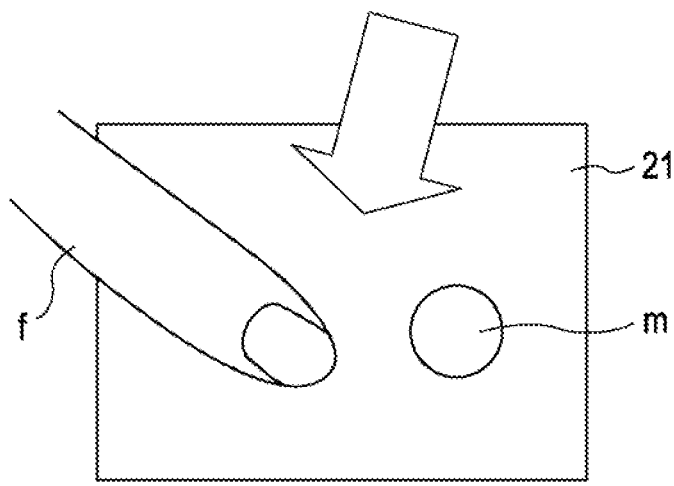
FIGS. 12A and 12B are diagrams showing a dynamic range of a light-receiving signal in the difference-image fingertip extraction process.
Figure 12B:
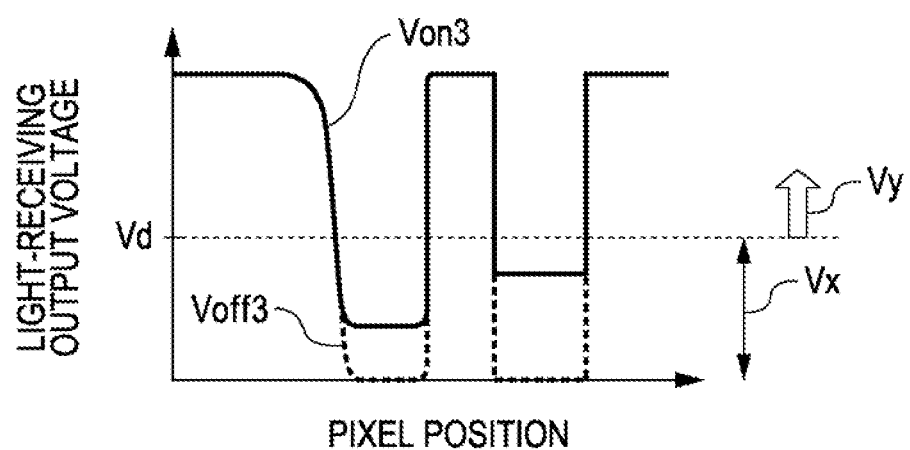
Figure 13A:
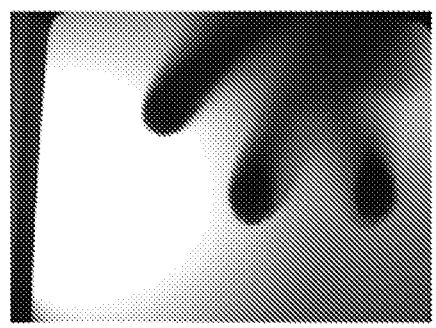
FIGS. 13A to 13D are photographic diagrams showing the difference-image fingertip extraction process when a plurality of fingertips to be detected coexist.
Figure 13B:
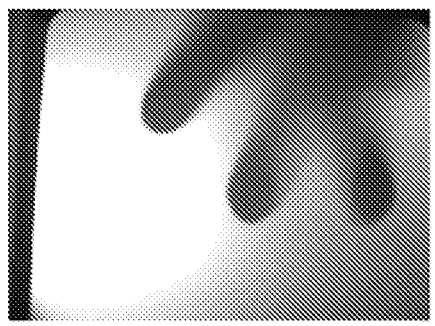
Figure 13C:
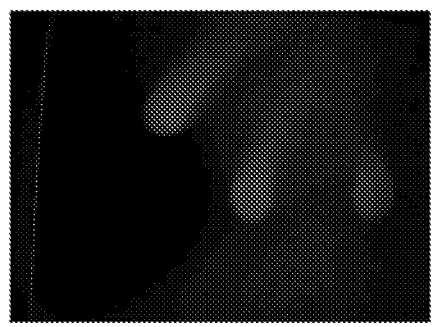
Figure 13D:
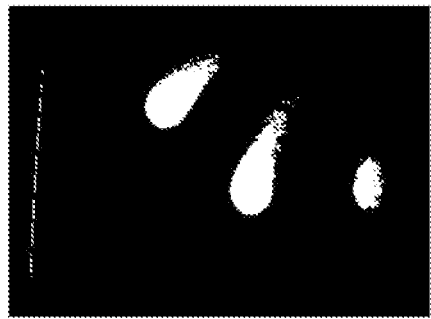

As shown in FIGS. 12A and 12B, a dynamic range for detecting a light-receiving output voltage is determined as follows. FIG. 12A shows objects touching the display area 21 of the I/O display panel 20. In FIG. 12A, a finger f touches the panel surface, and a circular object m having a reflectance of substantially 100% is placed on the display area 21. In this case, the light-receiving output voltage obtained on a line scanned for both the finger f and the object m exhibits a characteristic shown in FIG. 12B. In FIG. 12B, a voltage Von3 is a light-receiving output voltage under illumination of the backlight 15, and a voltage Voff3 is a light-receiving output voltage under non-illumination of the backlight 15.

As shown in FIG. 12B, in the portion where the object m having a reflectance of substantially 100% is placed, a voltage level Vy higher than a voltage Vd detected under illumination of the backlight 15 is unnecessary for observation, and a range Vx not higher than the level Vy is a dynamic range necessary for the detection. Therefore, it can be understood that a signal having the voltage level Vy unnecessary for observation is overflowed and is regarded to have the same intensity.

In the difference-image fingertip extraction process, as can be seen from images shown in FIGS. 13A to 13D, information relating to a plurality of touching or close objects displayed on the display area 21 of the I/O display panel 20, such as the position, shape, or size of those objects, can also be obtained. FIGS. 13A, 13B, 13C, and 13D show the images A, B, and C, and a binary image of the image C, respectively.

Figure 14:
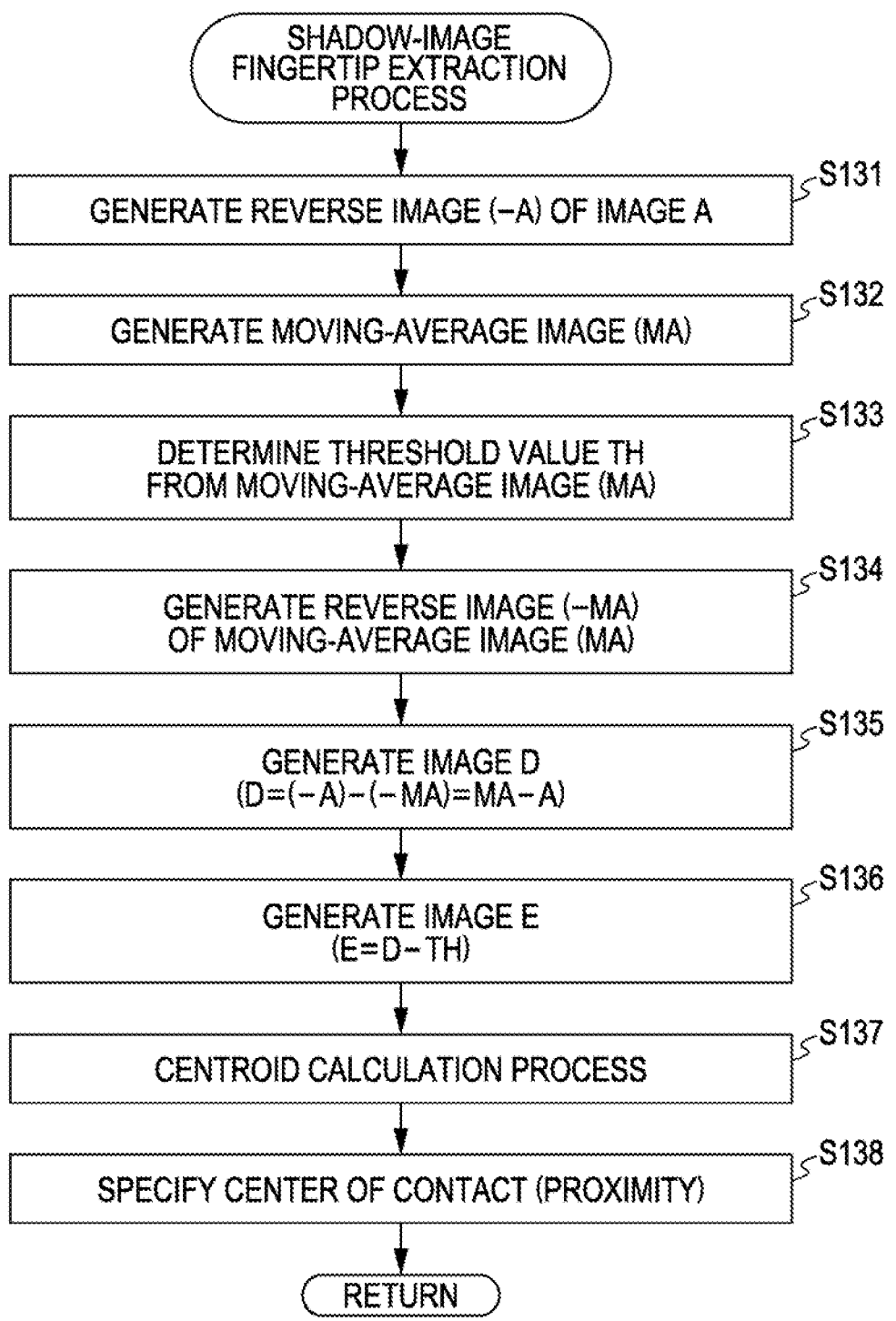
FIG. 14 is a flowchart showing the details of a shadow-image fingertip extraction process shown in FIG. 7.
Figure 15:
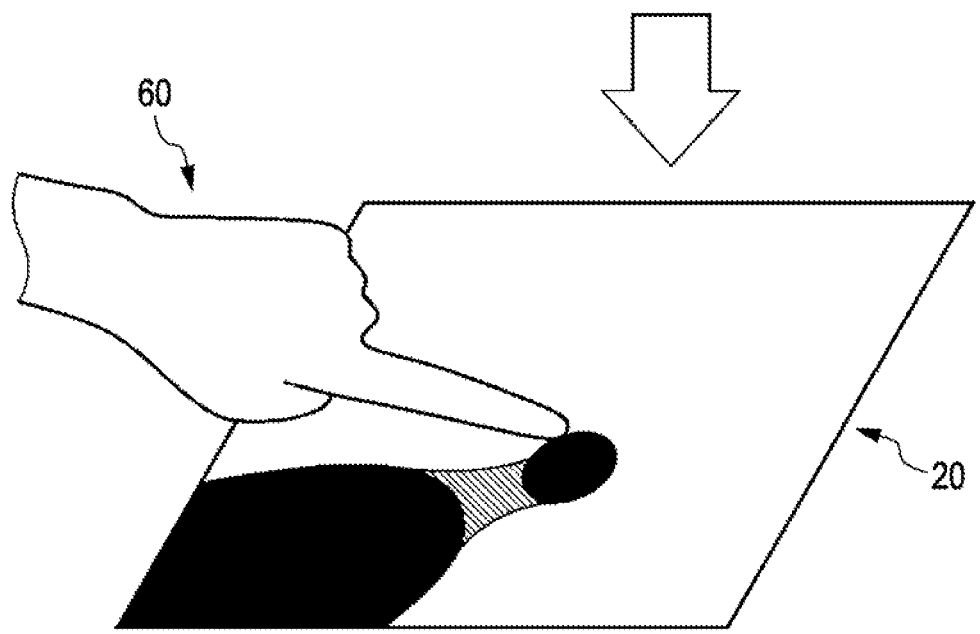
FIG. 15 is a perspective view showing the concept of the shadow-image extraction process.
Figure 16:
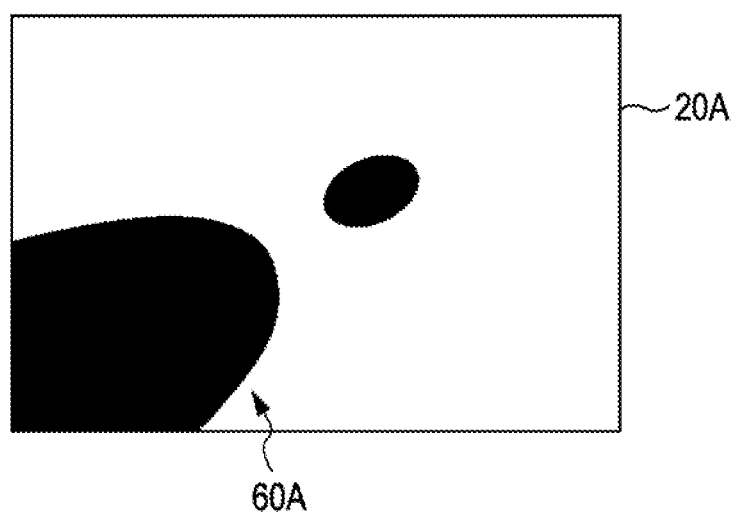
FIG. 16 is a schematic diagram showing an example of a captured image obtained in the shadow-image extraction process.

Next, the shadow-image fingertip extraction process will be described in detail with reference to FIGS. 14 to 21. FIG. 14 is a flowchart showing the details of the shadow-image fingertip extraction process, and FIG. 15 is a perspective view showing the shadow-image fingertip extraction process.

First, the image processing unit 14 generates a reverse image (−A) of the obtained image A (shadow image) (step S131). The image processing unit 14 further generates a moving-average image MA of the original image A (step S132).

Figure 19A:
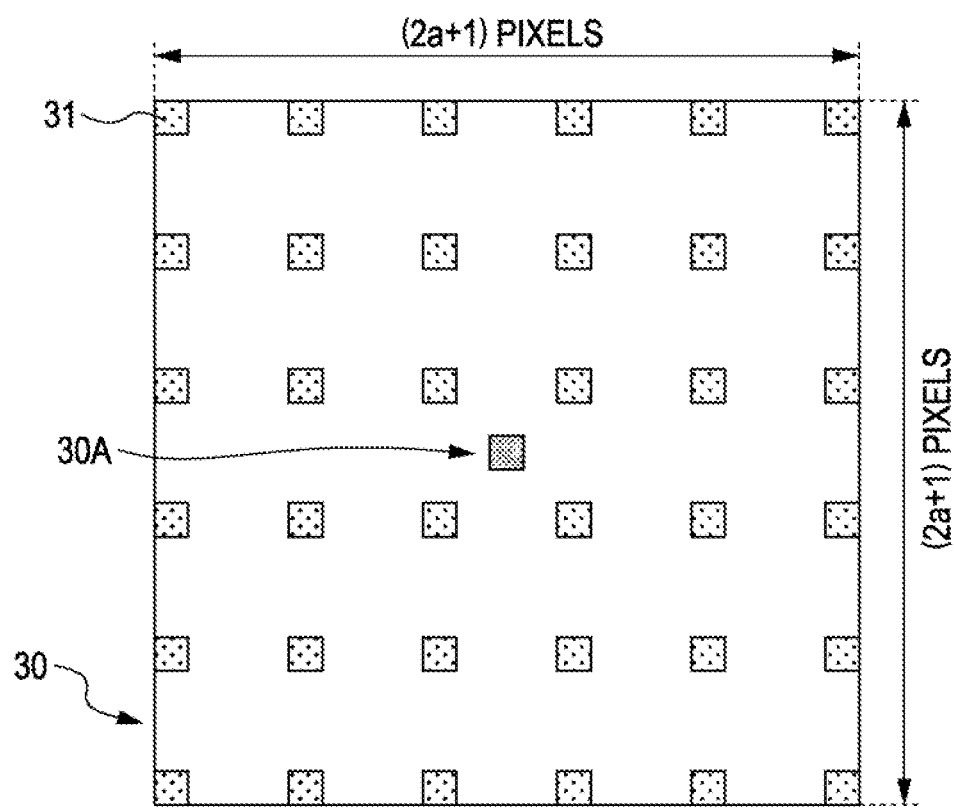
FIGS. 19A and 19B are diagrams showing a process for generating a moving-average image.
Figure 19B:
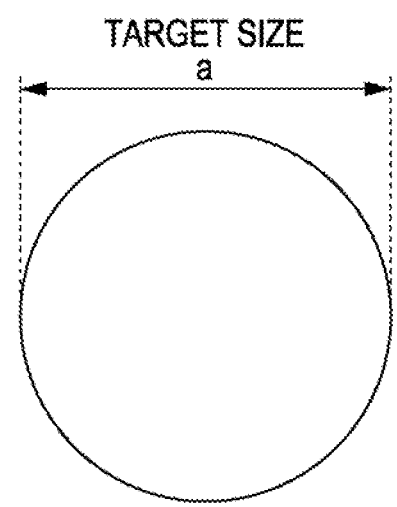
Figure 20:
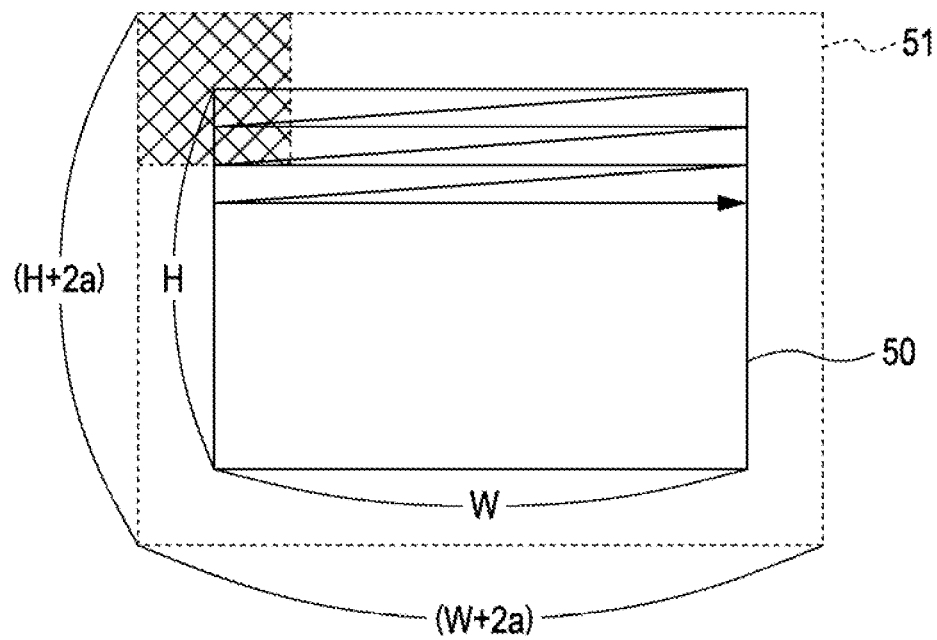
FIG. 20 is a diagram showing the process for generating a moving-average image.
Figure 21:
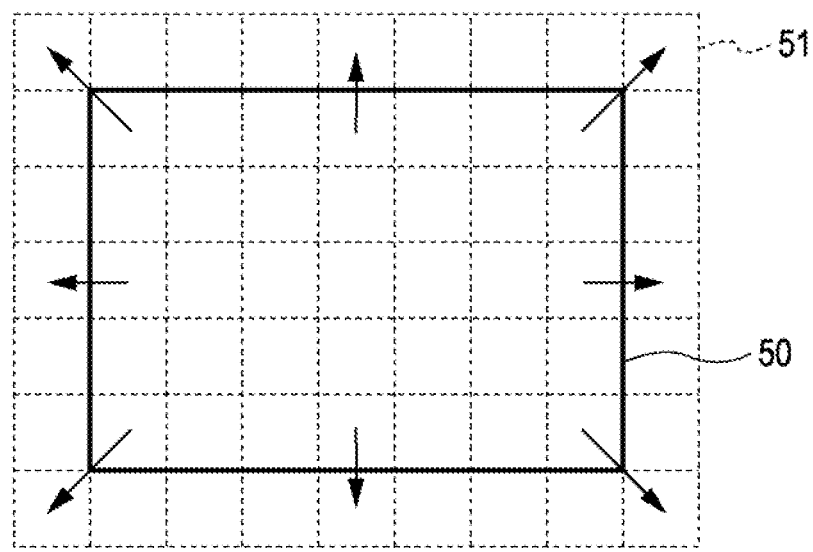
FIG. 21 is a diagram showing the process for generating a moving-average image.

Specifically, the moving-average image MA is generated by, for example, performing an averaging calculation of pixel data in a pixel region 30 of the image A shown in FIGS. 19A and 19B (in this example, a pixel region of (2a+1) pixels by (2a+1) pixels) including a target pixel 30A and pixels surrounding the target pixel 30A and by, for example, as shown in FIG. 20, sequentially shifting from the target pixel 30A to a next target pixel while reflecting the result of the averaging calculation performed in the pixel region including the target pixel 30A in an averaging calculation to be performed in a pixel region including the next target pixel so that the averaging calculation is performed over the entirety of the pixel region 50 of the captured image. The size (in this example, (2a+1) pixels by (2a+1) pixels) of the pixel region 50 used in an averaging calculation is preferably based on a predicted size (target size a) of the object to be detected (for example, the size of the pixel region 50 is set to be the same as the target size a). By setting the size of the pixel region 50 in this manner, for example, as seen in an image 20A shown in FIG. 16 (which corresponds to an image D or E described below), the detection of the fist portion (in FIG. 16, a portion 60A) together with the detection of the fingertip portion, which is a close object, can be prevented, as described in detail below. For example, as shown in FIG. 21, pixel data of a region 51 outside the pixel region 50 of the actual captured image, which is necessary for an averaging calculation, may be produced by directly copying and using the pixel data of the outer periphery of the pixel region 50.

Then, the image processing unit 14 determines a predetermined threshold value TH used in a subsequent step (step S136) from the moving-average image MA (step S133). Specifically, the threshold value TH is determined on the basis of the pixel data of the brightest pixel (i.e., the largest pixel value) in the moving-average image MA and the pixel data of the darkest pixel (i.e., the smallest pixel value) in the original image A (for example, by averaging the pixel values). Since the close object is not generally placed at the four corners of the display area 21, the average value of the pixel data of the pixels at the four corners may be used as the pixel data of the brightest pixel (i.e., the largest pixel value).

Then, the image processing unit 14 generates a reverse image (−MA) of the generated moving-average image MA (step S134), and generates a difference image representing a difference between the reverse image (−A) of the original image A and the reverse image (−MA) of the moving-average image MA, i.e., a difference image D=(−A)−(−MA)=MA−A representing a difference between the moving-average image MA and the original image A (step S135). Then, the image processing unit 14 generates an image E=D−TH by subtracting the threshold value TH determined in step S133 from the individual pixel data items of the image D (step S136).

Figure 17:
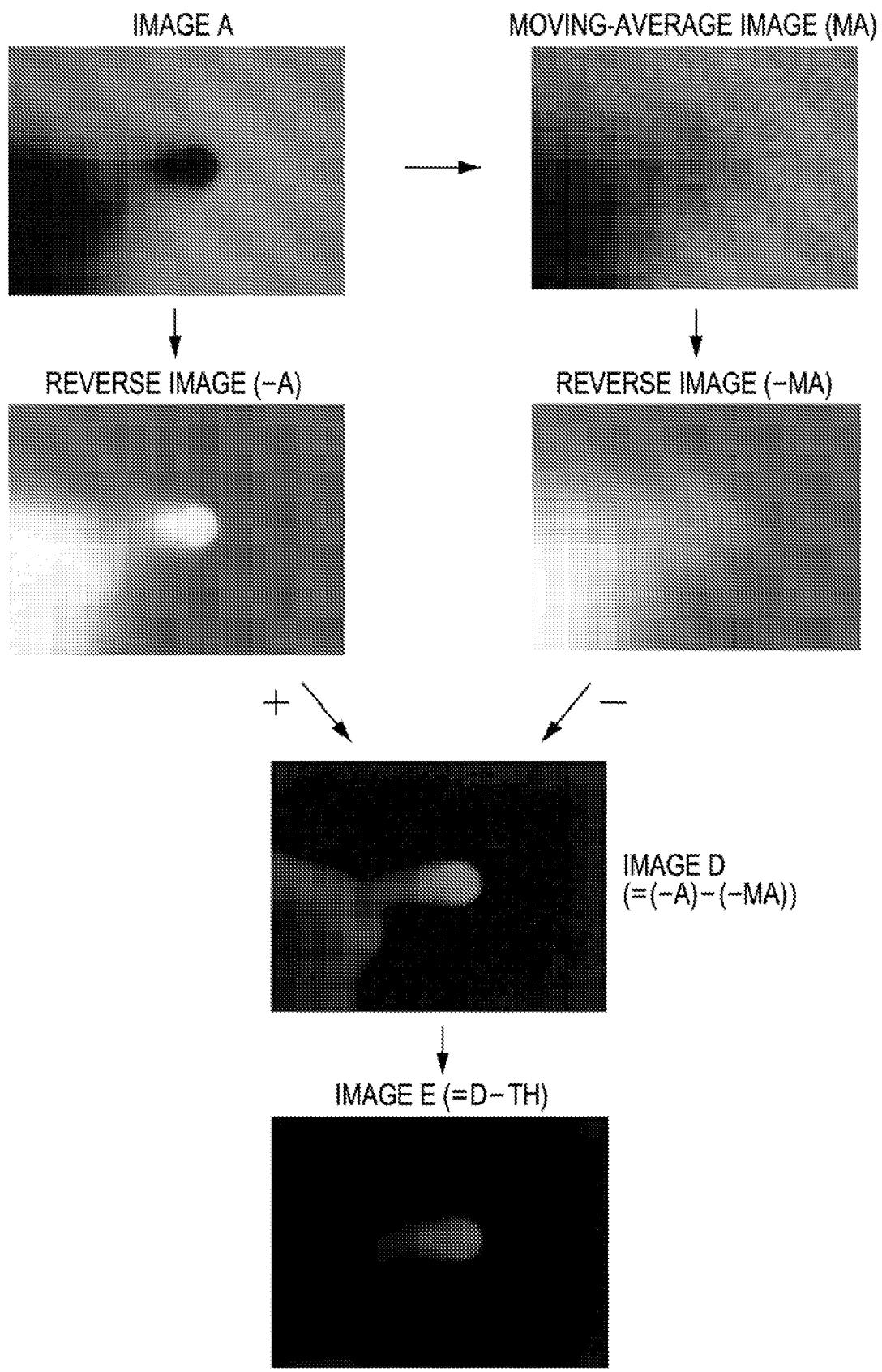
FIG. 17 is a photographic diagram showing the shadow-image fingertip extraction process.
Figure 18:
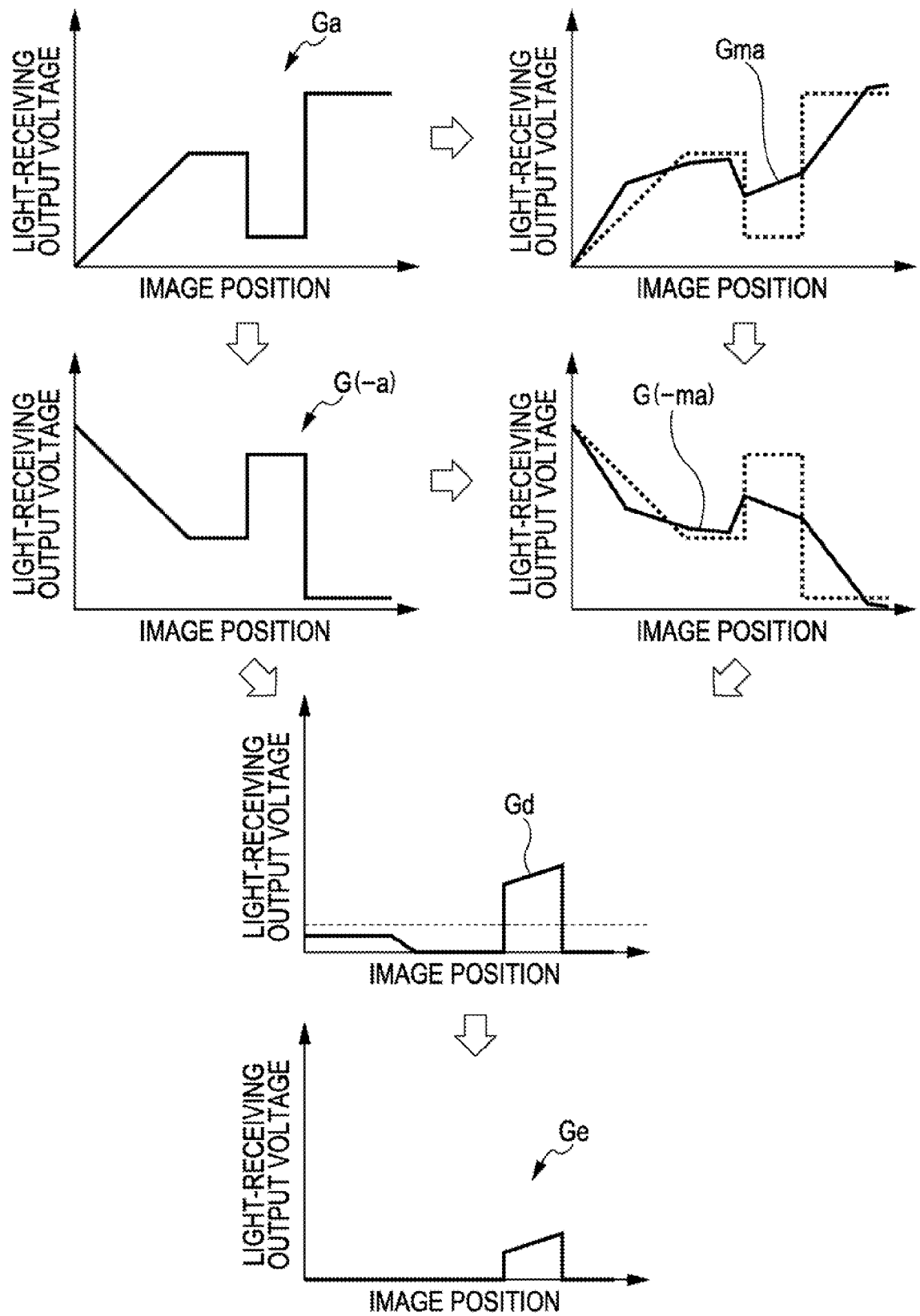
FIG. 18 is a diagram showing a light-receiving signal in the shadow-image fingertip extraction process.

As seen in the images D and E shown in FIG. 17 and example light-receiving output voltage waveforms Gd and Ge of the images D and E shown in FIG. 18, only the fingertip portion having substantially the same size as the target size a is detected while the fist portion larger than the fingertip portion is not detected. In FIG. 18, example light-receiving output voltage waveforms Ga, G(−a), Gma, and G(−ma) correspond to the original image A, the reverse image thereof (−A), the moving-average image MA, and the reverse image thereof (−MA), respectively.

Then, the image processing unit 14 calculates the centroid of the image E (step S137), and specifies the center of contact (or proximity) of the image E (step S138) in a manner similar to that in the difference-image fingertip extraction process described above.

In the shadow-image fingertip extraction process, therefore, the extraction of a fingertip portion is performed on the basis of the difference image D between the moving-average image MA of the image A captured using external light and the original image A. Thus, as described above, only an object having substantially the same size as the target size can be detected. Further, in the case where no display light is emitted (e.g., when the backlight 15 is continuously turned off such as when an imaging and display apparatus including transflective liquid crystal elements serving as display elements is used outdoor, when a black image is displayed on the I/O display panel 20, etc.), the close object can be detected.

In the shadow-image fingertip extraction process, as in the difference-image fingertip extraction process, information concerning a plurality of touching or close objects simultaneously positioned on the display area 21 of the I/O display panel 20, such as the position, shape, or size of those objects, can also be obtained.

In the imaging and display apparatus of the first embodiment, therefore, the above-described difference-image fingertip extraction process and shadow-image fingertip extraction process are taken into account, and a detection result of a close object obtained using either extraction process is output as a final result from the image processing unit 14 to the application program execution unit 11.

FIG. 22 shows the comparison between the features of those two fingertip extraction processes, namely, the difference-image fingertip extraction process and the shadow-image fingertip extraction process. In FIG. 22, circles indicate "good" fingertip extraction under the corresponding conditions, square indicate "good" or "bad" fingertip extraction under the corresponding conditions depending on the situation, and crosses indicate basically "bad" fingertip extraction under the corresponding conditions. As can be seen from FIG. 22, in bright environments, the difference-image fingertip extraction process is more suitable, and the extraction result of the difference-image fingertip extraction process can be preferably adopted. When the backlight 15 is not illuminated and no display light is emitted or when black display is provided, on the other hand, the difference-image fingertip extraction process may not be successfully performed, and the extraction result of the shadow-image fingertip extraction process can be preferably adopted.

Next, some examples of execution of the application program by the application program execution unit 11 using the information detected by the above-described fingertip extraction processes, such as the position of an object, will be described with reference to FIGS. 23A to 26.

Figure 23A:
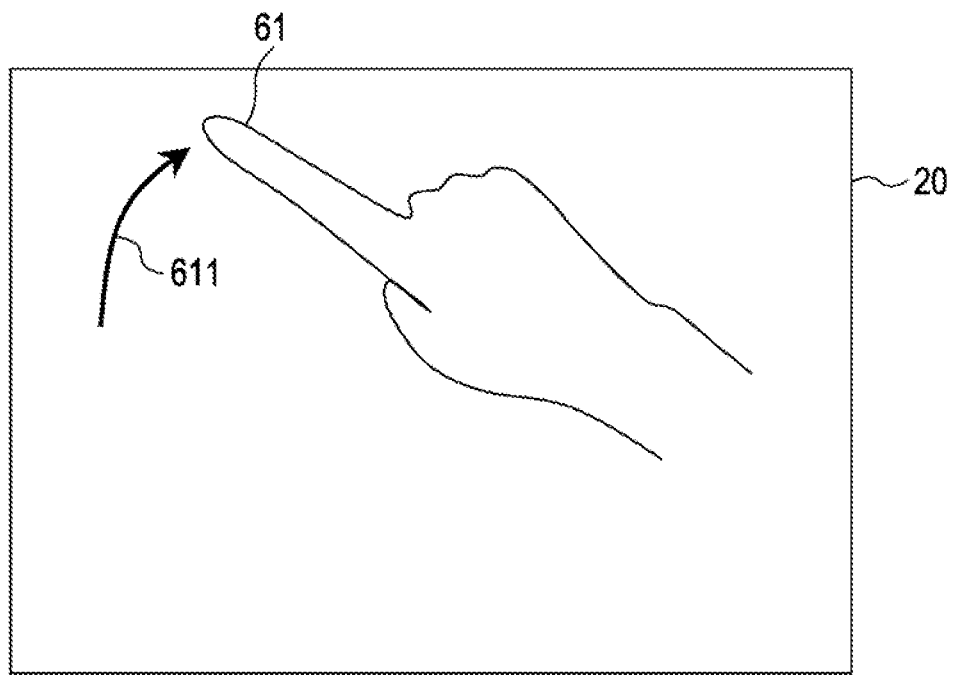
FIGS. 23A and 23B are diagrams showing example applications using a result of a fingertip extraction process.

FIG. 23A shows an example in which a fingertip 61 touches the surface of the I/O display panel 20 and a line 611 is drawn on the screen so as to follow the trajectory of the contact point of the fingertip 61.

Figure 23B:
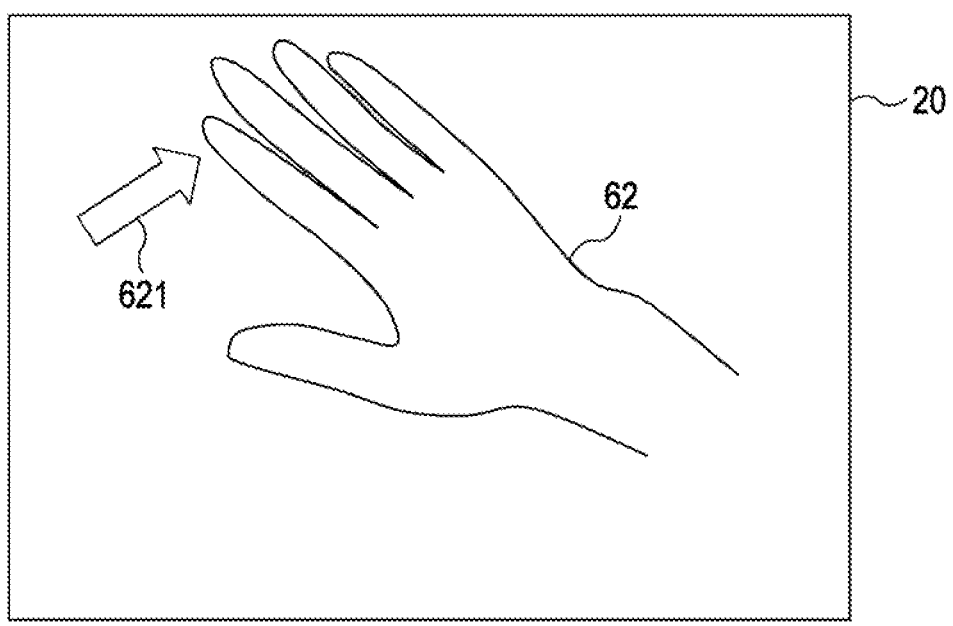

FIG. 23B shows an example of gesture recognition using a hand model. Specifically, the shape of a hand 62 touching (or in close proximity to) the I/O display panel 20 is recognized, and the recognized shape of the hand 62 is displayed as an image. A movement (palm tool) 621 of the displayed object is used to perform some appropriate processing.

In the example shown in FIG. 24, a hand changes from a closed state 63A to an open state 63B, and the touch or proximity of the hand in each of the closed state 63A and the open state 63B is recognized by the I/O display panel 20 using image recognition, and processing based on the image recognition is performed. Such recognition-based processing may be performed to execute an instruction such as a "zoom in" instruction. Therefore, for example, the I/O display panel 20 is connected to a personal computer apparatus, and the user can input an instruction to switch commands on the computer apparatus using the image recognition in a more natural fashion.

Further, for example, as shown in FIG. 25, a plurality of I/O display panels 20 may be used and connected by a transmission medium. In this case, a detected image of an object touching or in close proximity to one of the I/O display panels 20 may be transmitted to another I/O display panel to display the image so that the users operating both I/O display panels can communicate with each other. Specifically, as shown in FIG. 25, two I/O display panels 20-1 and 20-2 are provided. A handprint of a hand 65 recognized by the I/O display panel 20-1 using image recognition is transmitted to the I/O display panel 20-2 to display a handprint 642 on the I/O display panel 20-2. Further, a trajectory 641 of a hand 64 moving in contact with the I/O display panel 20-2 is transmitted to the I/O display panel 20-1 to display the trajectory on the I/O display panel 20-1. In this way, an object being drawn can be transmitted and displayed as a moving image. Further, handwritten characters, figures, etc., are transmitted from one party to another, thus providing a novel communication tool. For example, the I/O display panel 20 can be used as a display panel of a mobile phone terminal.

Figure 26:
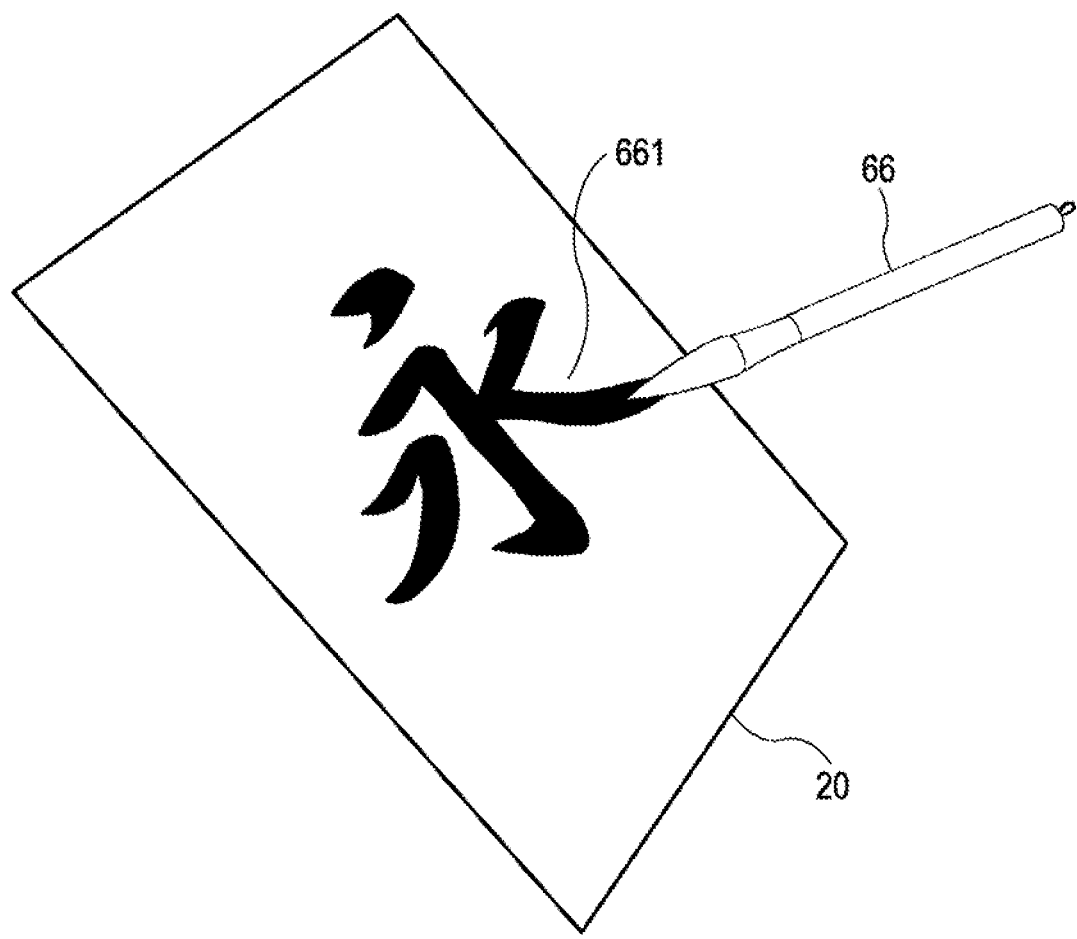
FIG. 26 is a diagram showing an example application using a result of a fingertip extraction process.

For example, as shown in FIG. 26, a user writes a Japanese character on the surface of the I/O display panel 20 using a writing brush 66, and a set of contact points of the writing brush 66 is displayed as an image 661 on the I/O display panel 20, thereby providing a brush handwriting input. In this case, the fine stroke of the writing brush 66 can be recognized and displayed. In handwriting recognition techniques of the related art, for example, some digitizers determine the tilt of a special pen by detecting an electric field. In the first embodiment, in contrast, the contact of a writing brush is detected, thus providing a more realistic information input.

In the first embodiment, therefore, a difference image C representing a difference between an image B (display-light-based image) obtained by imaging a close object using display light and an image A (shadow image) obtained by imaging a shadow of the close object is generated, and information concerning at least one of the position, shape, and size of the close object is detected taking the image A (shadow image) and the difference image C into account. Thus, an object can be detected regardless of the environmental condition or the current use condition such as the brightness of display light.

Further, a moving-average image MA is generated on the basis of the image A. The object is detected using the difference image D between the moving-average image MA and the original image A, and an image E obtained by subtracting a threshold value TH from the individual pixel data items of the difference image D. In addition, the size of the pixel region 50 used in the averaging calculation process is set to be the same as a predicted size (target size) of the object to be detected. Therefore, for example, only the fingertip portion having substantially the same size as the target size can be detected while the fist portion larger than the fingertip portion is not detected, resulting in more reliable detection of the object.

Furthermore, in one operating cycle (one display frame period), the image A (shadow image) is obtained before the image B (display-light-based image) is obtained. This ensures a sufficient time for calculating the moving-average image MA, which takes a long time, before performing the difference-image fingertip extraction process, as shown in FIG. 7, and the overall processing time can be shorter than that when the image B is obtained before the image A is obtained.

In the first embodiment, the difference-image fingertip extraction process is used as a primary process and the shadow-image fingertip extraction process is used as a secondary process. However, conversely, the difference-image fingertip extraction process may be used as a secondary process and the shadow-image fingertip extraction process may be used as a primary process.

An imaging and display apparatus according to a second embodiment will now be described. In the imaging and display apparatus of the second embodiment, one of the difference-image fingertip extraction process and the shadow-image fingertip extraction process is selected on the basis of a predetermined index, and the selected fingertip extraction process is performed. The remaining structure and operation are similar to those of the first embodiment, and a description thereof is thus omitted.

Figure 27:
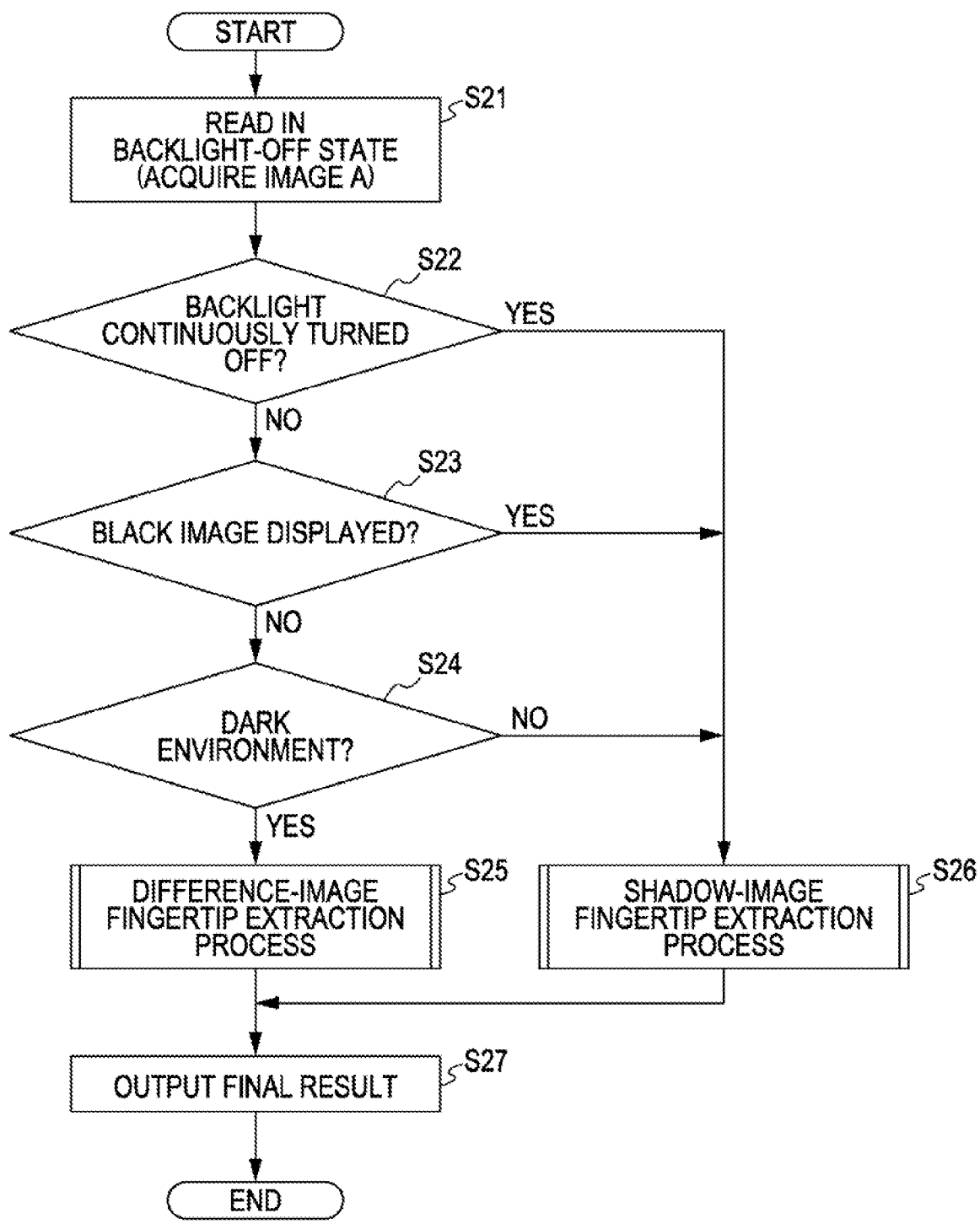
FIG. 27 is a flowchart showing a fingertip extraction process according to a second embodiment.

FIG. 27 is a flowchart showing a fingertip extraction process according to the second embodiment. As can be seen from FIG. 27, when the image A (shadow image) is obtained in a manner similar to that in the first embodiment (step S21), the image processing unit 14 selectively performs a more reliable fingertip extraction process suitable for the situation, which can also be determined according to the comparison table shown in FIG. 22 (steps S22 to S26).

Specifically, when the backlight 15 is continuously turned off ("YES" in step S22), when a black image is displayed ("YES" in step S23), or when the environment is not dark ("NO" in step S24), the shadow-image fingertip extraction process is selectively performed (step S26), and a final result is output (step S27). The determination as to whether or not the environment is dark is performed on the basis of the magnitude of the pixel data in the image A (shadow image). That is, if the value of the pixel data is small, it is determined that the environment is dark.

Conversely, when the backlight 15 is not continuously turned off ("NO" in step S22), when no black image is displayed ("NO" in step S23), and the environment is dark ("YES" in step S24), the difference-image fingertip extraction process is selectively performed (step S25), and a final result is output (step S27).

In the second embodiment, therefore, one of the difference-image fingertip extraction process and the shadow-image fingertip extraction process is selected on the basis of a predetermined index, and the selected fingertip extraction process is performed. Thus, a more suitable fingertip extraction process can be used, thus ensuring a reliable extraction process in accordance with more various use conditions.

An imaging and display apparatus according to a third embodiment will now be described. In the imaging and display apparatus of the third embodiment, both the difference-image fingertip extraction process and the shadow-image fingertip extraction process are performed in any situation, and a composite image generated by combining the image A (shadow image) and the difference image C is used to perform a fingertip extraction process. The remaining structure and operation are similar to those of the first embodiment, and a description thereof is thus omitted.

Figure 28:
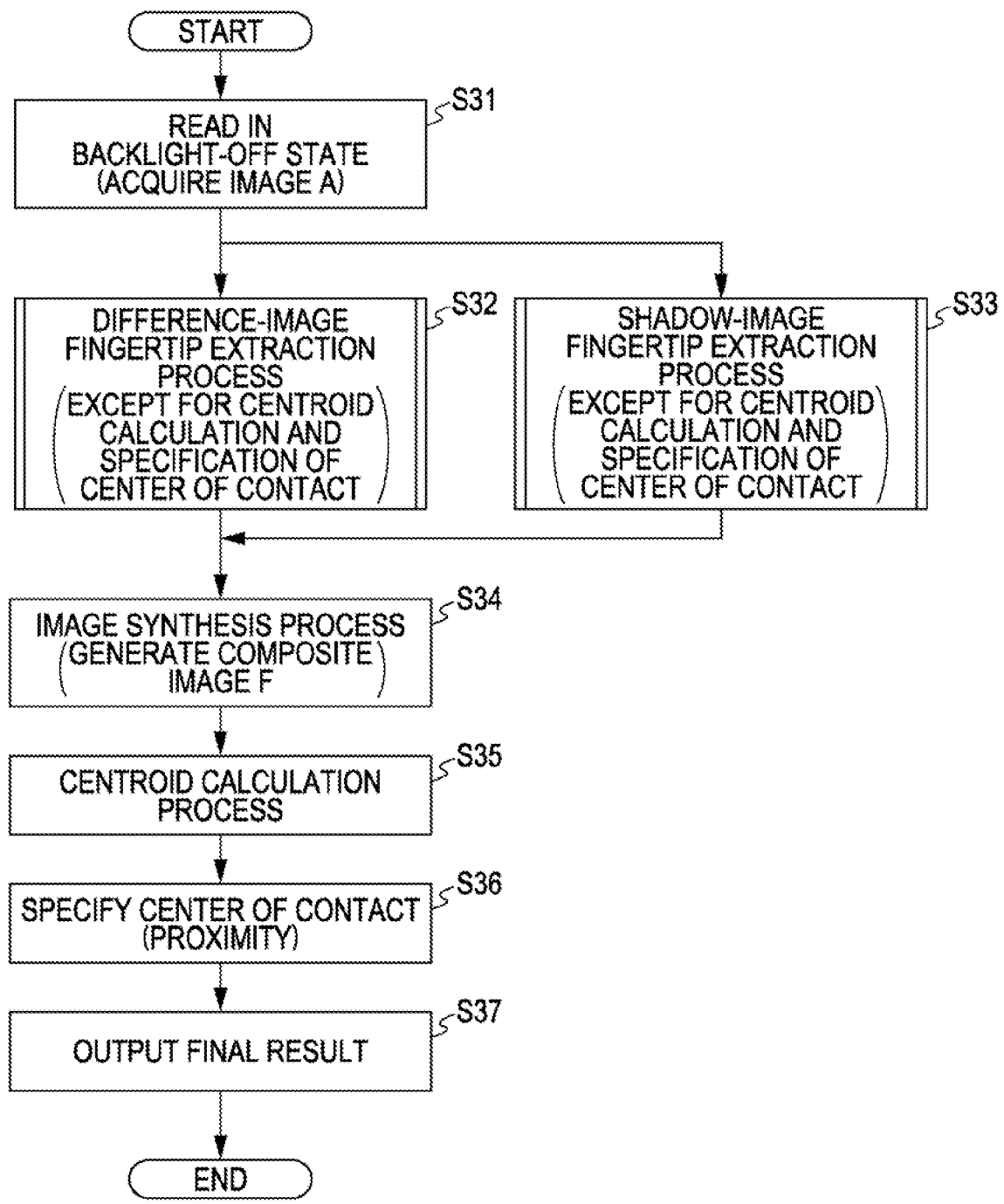
FIG. 28 is a flowchart showing a fingertip extraction process according to a third embodiment.

FIG. 28 is a flowchart showing a fingertip extraction process according to the third embodiment. As can be seen from FIG. 28, when the image A (shadow image) is obtained in a manner similar to that in the first embodiment (step S31), the difference-image fingertip extraction process and shadow-image fingertip extraction process described above, except for the centroid calculation and the center-of-contact (proximity) specification, are performed (steps S32 and S33).

Figure 29:
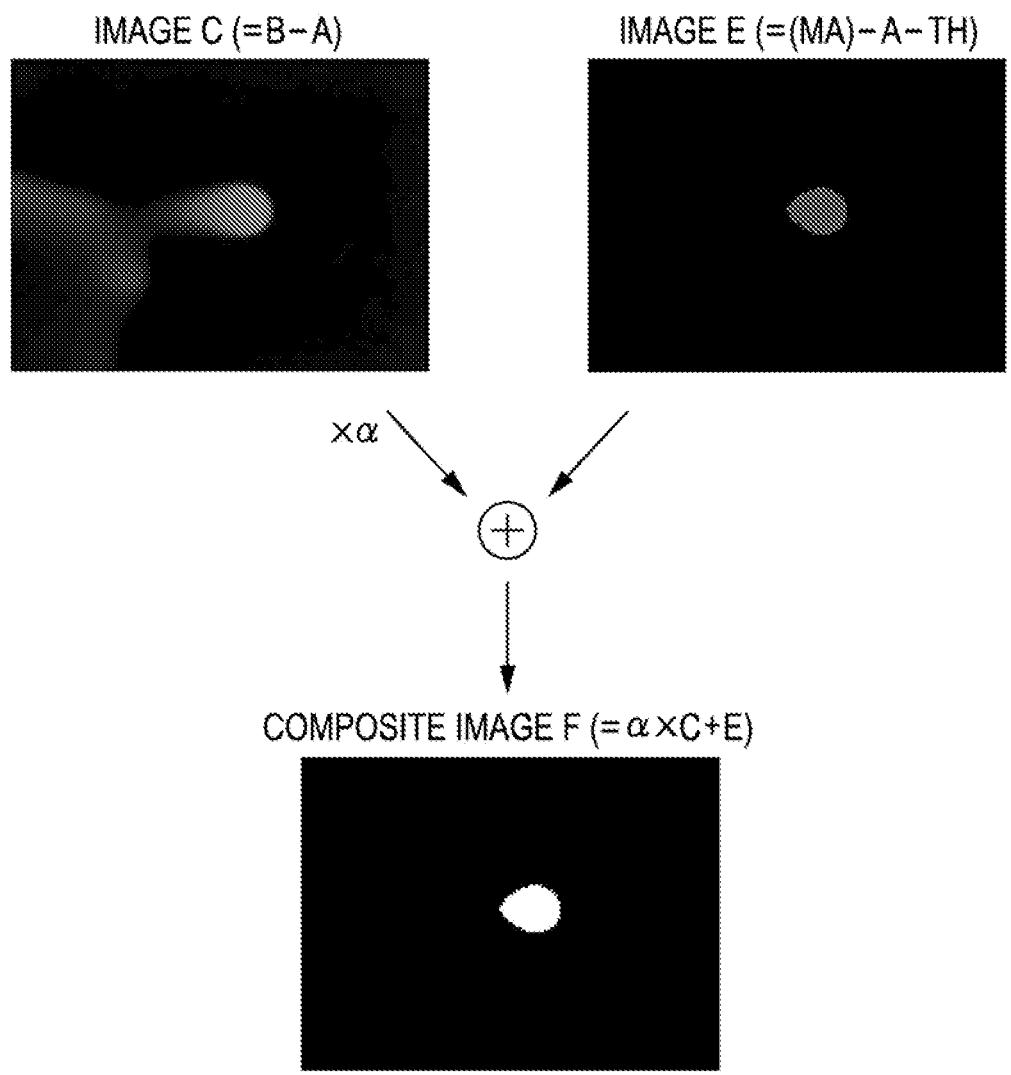
FIG. 29 is a photographic diagram showing an image synthesis process shown in FIG. 28.

Then, for example, as shown in FIG. 29, a composite image $F = \square \times C + E$ is generated by combining the difference image C generated in the difference-image fingertip extraction process and the image E generated in the shadow-image fingertip extraction process (step S34), where $\square$ denotes a predetermined weighting factor.

Then, the centroid calculation (step S35), the specification of the center of contact (proximity) (step S36), and the outputting of a final result (step S37) are performed in a manner similar to that in the first embodiment.

In the third embodiment, therefore, both the difference-image fingertip extraction process and the shadow-image fingertip extraction process are performed in any situation, and a composite image $F = \square \times C + E$ is generated by combining the difference image C generated in the difference-image fingertip extraction process and the image E generated in the shadow-image fingertip extraction process. A fingertip extraction process is performed on the composite image F. Therefore, for example, an image such as a fingertip can be more clearly detected in the manner shown in FIG. 29, and a more reliable extraction process can be achieved.

An imaging and display apparatus according to a fourth embodiment will now be described. The structure of the imaging and display apparatus according to the fourth embodiment is similar to that shown in FIG. 1, and a description thereof is thus omitted.

The basic operation of the imaging and display apparatus of the fourth embodiment, i.e., the operation for displaying an image and the operation for imaging an object, will be described.

In the imaging and display apparatus, a drive signal for display is generated by the display drive circuit 12 on the basis of the display data supplied from the application program execution unit 11, and the I/O display panel 20 is driven by the drive signal to perform a line-sequential display operation to display an image. The backlight 15 is also driven by the display drive circuit 12 to turn on or off in synchronization with the operation of the I/O display panel 20.

The relationship between the on-off state of the backlight 15 and the display state of the I/O display panel 20 will now be described with reference to FIGS. 30A and 30B.

First, in the example shown in FIG. 30A, when an image is displayed for a frame period of, for example, 1/60 seconds, the backlight 15 is illuminated (or turned on) in the first half period (1/120 seconds) of each frame period, and a display signal is supplied to the pixels to display an image for the corresponding frame period. In the second half period of each frame period, the backlight 15 is not illuminated (or turned off), and no display is performed.

In the example shown in FIG. 30B, conversely, the backlight 15 is not illuminated (or turned off) in the first half period of each frame period, and no image is displayed. In the second half period of each frame period, the backlight 15 is illuminated (or turned on), and a display signal is supplied to the pixels to display an image for the corresponding frame period.

Accordingly, one of the first and second half periods of each frame period is a light-emission period during which display light is emitted from the I/O display panel 20, and the other half period of each frame period is a non-light-emission period during which no display light is emitted from the I/O display panel 20.

When an object (e.g., a fingertip) touches or comes in close proximity to the I/O display panel 20, the light-receiving drive circuit 13 performs line-sequential light-receiving driving to image the object using the light-receiving elements of the pixels in the I/O display panel 20, and the light signals received from the light-receiving elements are supplied to the light-receiving drive circuit 13. In the light-receiving drive circuit 13, light signals received from the pixels for one frame are stored and are output as a captured image to the image processing unit 14.

The image processing unit 14 performs a predetermined image processing (calculation) operation, as described below, on the basis of the captured image to detect information relating to the object touching or in close proximity to the I/O display panel 20 (e.g., position coordinate data, data relating to the shape or size of the object, etc.).

Figure 31:
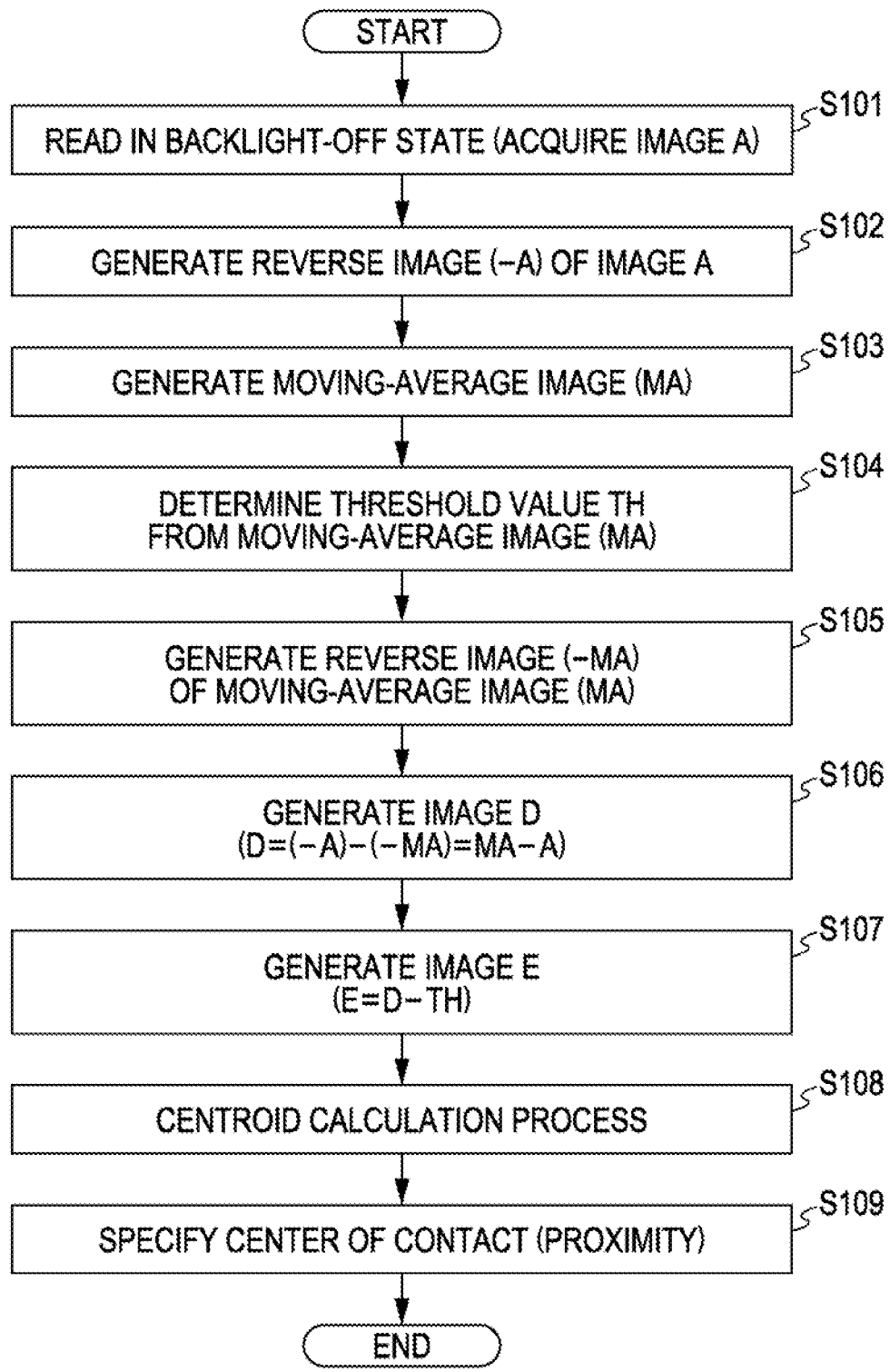
FIG. 31 is a flowchart showing a shadow-image fingertip extraction process performed by an image processing unit of the imaging and display apparatus according to the fourth embodiment.

Next, an extraction process (shadow-image fingertip extraction process) using a shadow of an object (close object), such as a fingertip, touching or in close proximity to the I/O display panel 20 performed by the image processing unit 14, which is a feature of the fourth embodiment, will be described in detail with reference to FIGS. 31 to 35. FIG. 31 is a flowchart showing the shadow-image fingertip extraction process performed by the image processing unit 14.

Figure 32:
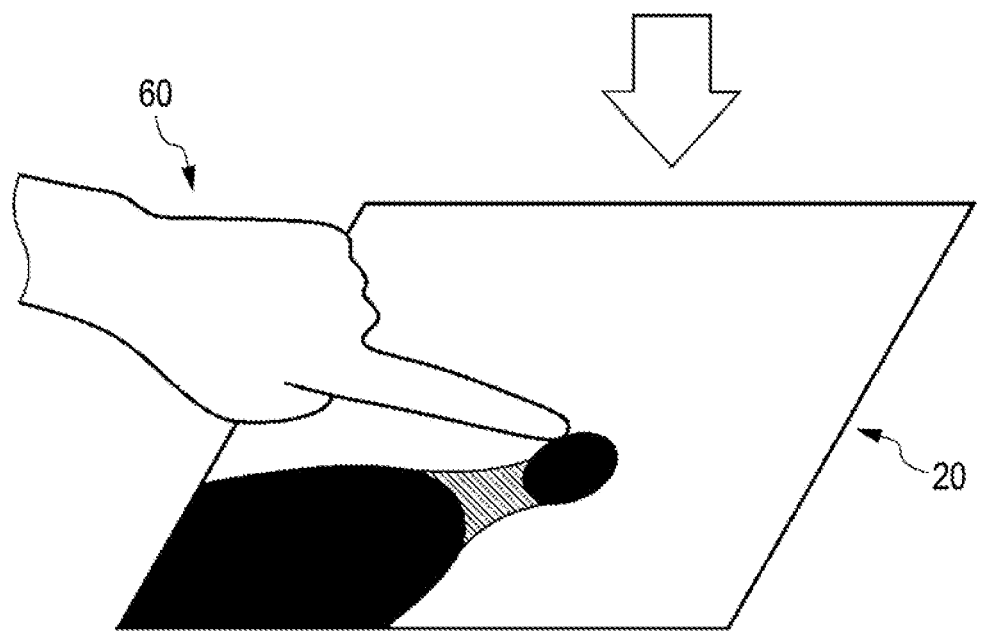
FIG. 32 is a perspective view showing the concept of the shadow-image extraction process.
Figure 33:
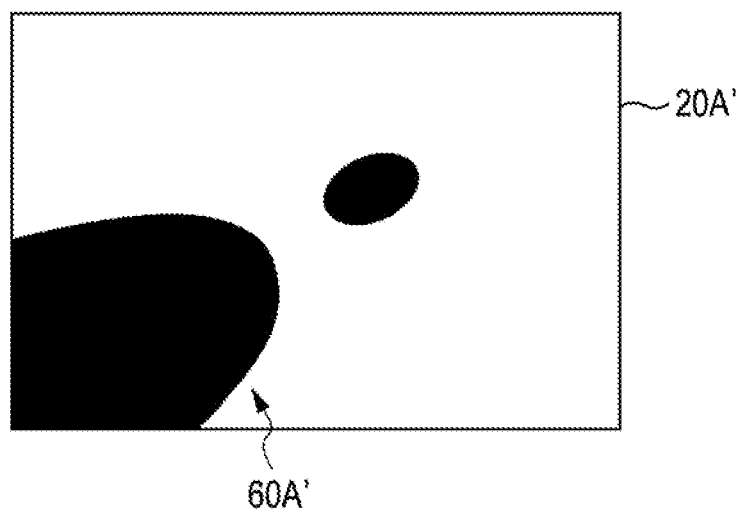
FIG. 33 is a schematic diagram showing an example of a captured image obtained in the shadow-image extraction process.

First, in a period of one display frame period during which the backlight 15 is turned off (non-light-emission period), for example, as shown in FIG. 32, the I/O display panel 20 images a shadow of a close object 60 using external light, and acquires an image A (shadow image) (step S101 shown in FIG. 31).

Then, the image processing unit 14 generates a reverse image (−A) of the obtained image A (shadow image) (step S1102). Then, the image processing unit 14 generates a moving-average image MA of the original image A (step S1103).

Specifically, as described above with reference to FIGS. 19A to 20, the moving-average image MA is generated by, for example, performing an averaging calculation of pixel data in the pixel region 30 of the image A (in this example, a pixel region of (2a+1) pixels by (2a+1) pixels) including the target pixel 30A and pixels surrounding the target pixel 30A and by sequentially shifting from the target pixel 30A to a next target pixel while reflecting the result of the averaging calculation performed in the pixel region including the target pixel 30A in an averaging calculation to be performed in a pixel region including the next target pixel so that the averaging calculation is performed over the entirety of the pixel region 50 of the captured image. The size (in this example, (2a+1) pixels by (2a+1) pixels) of the pixel region 50 used in an averaging calculation is preferably based on a predicted size (target size a) of the object to be detected (for example, the size of the pixel region 50 is set to be the same as the target size a). By setting the size of the pixel region 50 in this manner, for example, as seen in an image 20A' shown in FIG. 33 (which corresponds to an image D, E, or G described below), the detection of the fist portion (in FIG. 33, a portion 60A') together with the detection of the fingertip portion, which is a close object, can be prevented, as described in detail below. For example, as described above with reference to FIG. 21, pixel data of the region 51 outside the pixel region 50 of the actual captured image, which is necessary for an averaging calculation, may be produced by directly copying and using the pixel data of the outer periphery of the pixel region 50.

Then, the image processing unit 14 determines a predetermined threshold value TH used in a subsequent step (step S107) from the moving-average image MA (step S104). Specifically, the threshold value TH is determined on the basis of the pixel data of the brightest pixel (i.e., the largest pixel value) in the moving-average image MA and the pixel data of the darkest pixel (i.e., the smallest pixel value) in the original image A (for example, by averaging the pixel values). Since the close object is not generally placed at the four corners of the display area 21, the average value of the pixel data of the pixels at the four corners may be used as the pixel data of the brightest pixel (i.e., the largest pixel value).

Then, the image processing unit 14 generates a reverse image (−MA) of the generated moving-average image MA (step S105), and generates a difference image representing a difference between the reverse image (−A) of the original image A and the reverse image (−MA) of the moving-average image MA, i.e., a difference image D=(−A)−(−MA)=MA−A representing a difference between the moving-average image MA and the original image A (step S106). Then, the image processing unit 14 generates an image E=D−TH by subtracting the threshold value TH determined in step S104 from the individual pixel data items of the image D (step S107). Instead of the generation of the image E in step S107, for example, the individual pixel data items of the image D may be binarized to generate a binary image G, as shown in FIG. 34 and a light-receiving output voltage waveform Gf of the image G shown in FIG. 35, and the subsequent processing (steps S108 and S109) may be performed on the basis of the binary image G.

Figure 34:
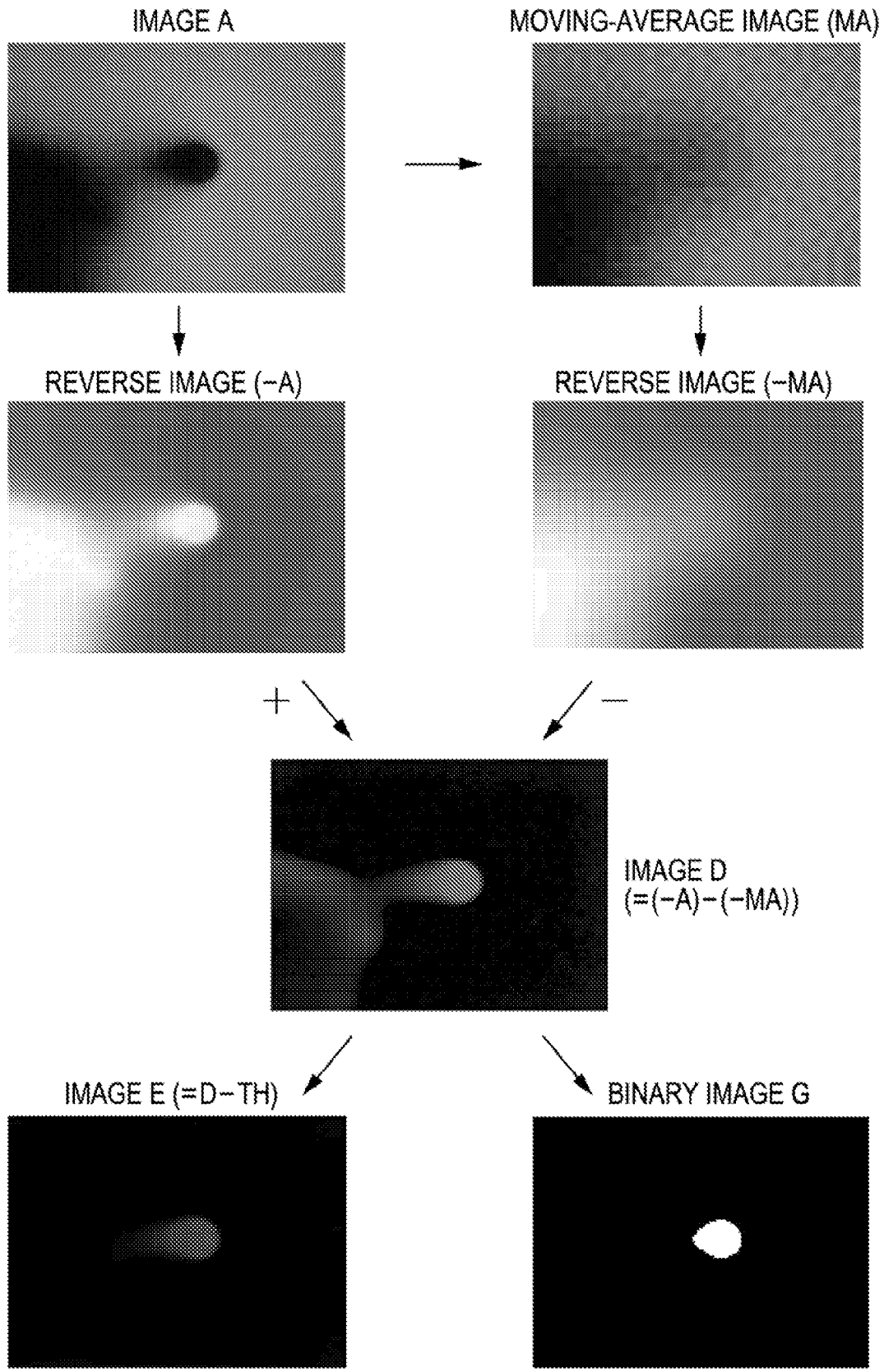
FIG. 34 is a photographic diagram showing the shadow-image fingertip extraction process.
Figure 35:
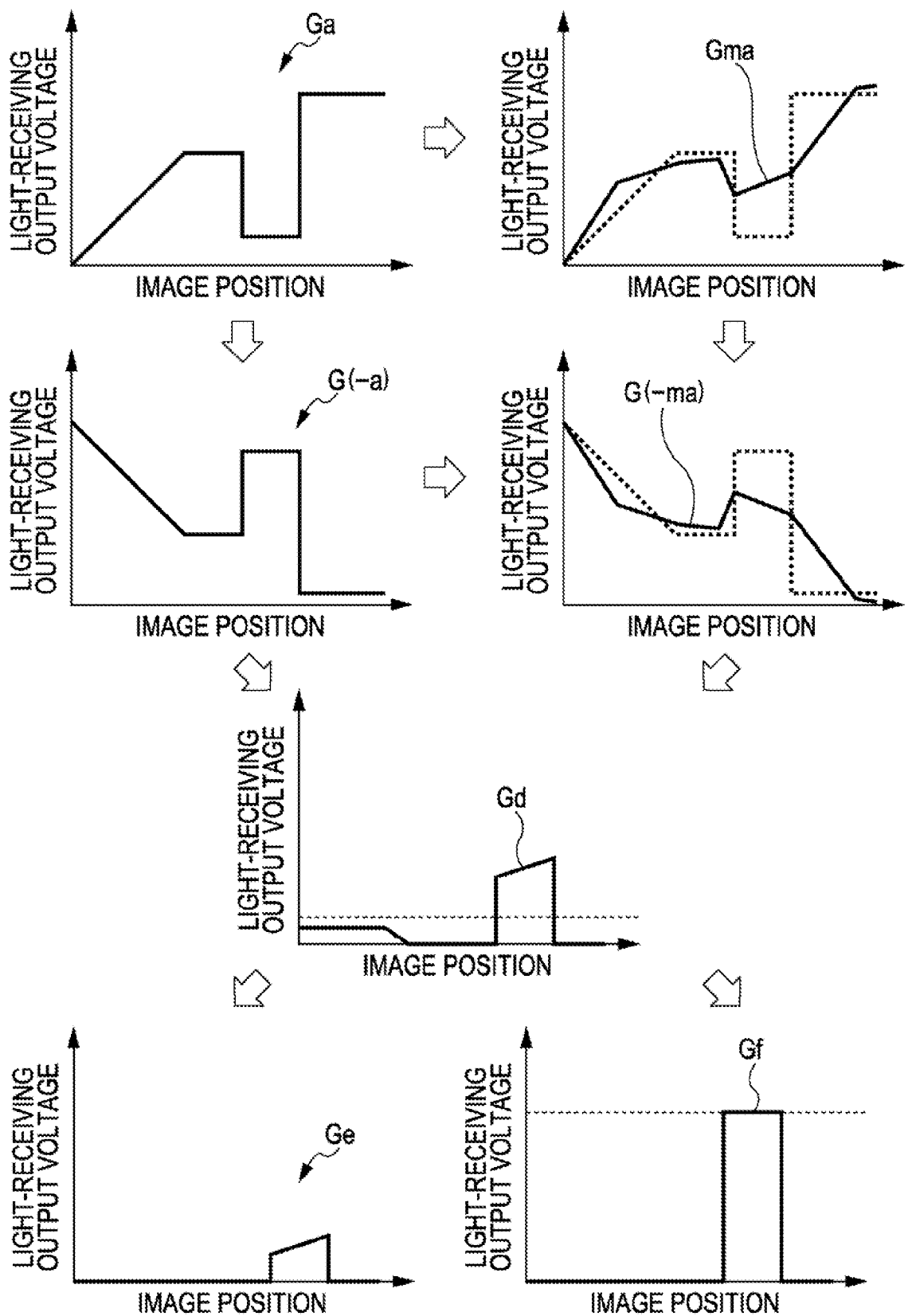
FIG. 35 is a diagram showing a light-receiving signal in the shadow-image fingertip extraction process.

As seen in the images D, E, and F shown in FIG. 34 and example light-receiving output voltage waveforms Gd, Ge, and Gf of the images D, E, and F shown in FIG. 35, only the fingertip portion having substantially the same size as the target size a is detected while the fist portion larger than the fingertip portion is not detected. In FIG. 35, example light-receiving output voltage waveforms Ga, G(−a), Gma, and G(−ma) correspond to the original image A, the reverse image thereof (−A), the moving-average image MA, and the reverse image thereof (−MA), respectively.

Then, the image processing unit 14 performs a calculation operation to determine the centroid of the image E (or F) (step S108), and specifies the center of contact (or proximity) of the image E (or F) (step S109).

In the shadow-image fingertip extraction process according to the fourth embodiment, therefore, information relating to an object touching or in close proximity to the I/O display panel 20 (e.g., position coordinate data, data relating to the shape or size of the object, etc.) is detected on the basis of the image A (shadow image) captured using external light.

Further, the extraction of a fingertip portion is performed on the basis of the difference image D between the moving-average image MA of the image A and the original image A. Thus, as described above, only an object having substantially the same size as the target size can be detected. Further, in the case where no display light is emitted (e.g., when the backlight 15 is continuously turned off, such as when an imaging and display apparatus including transflective liquid crystal elements serving as display elements is used outdoor, when a black image is displayed on the I/O display panel 20, etc.), the close object can be detected.

Furthermore, in the shadow-image fingertip extraction process, information concerning a plurality of touching or close objects simultaneously positioned on the display area 21 of the I/O display panel 20, such as the position, shape, or size of those objects, can also be obtained.

Examples of execution of the application program by the application program execution unit 11 using the information detected by the shadow-image fingertip extraction process according to the fourth embodiment, such as the position of an object, are similar to those shown in FIGS. 23A to 26, and a description thereof is thus omitted.

In the fourth embodiment, therefore, an image A (shadow image) obtained by imaging a shadow of an object touching or in close proximity to the I/O display panel 20 is used to detect information concerning at least one of the position, shape, and size of the close object. Thus, an object can be detected regardless of the environmental condition or the current use condition such as the brightness of display light.

Further, a moving-average image MA is generated on the basis of the image A. The object is detected using the difference image D between the moving-average image MA and the original image A, and an image E obtained by subtracting a threshold value TH from the individual pixel data items of the difference image D or a binary image G of the difference image D. In addition, the size of the pixel region 50 used in the averaging calculation process is set to be the same as a predicted size (target size) of the object to be detected. Therefore, for example, only the fingertip portion having substantially the same size as the target size can be detected while the fist portion larger than the fingertip portion is not detected, resulting in more reliable detection of the object.

While several embodiments have been described, the present application is not limited to those embodiments, and a variety of modifications can be made.

Figure 36A:
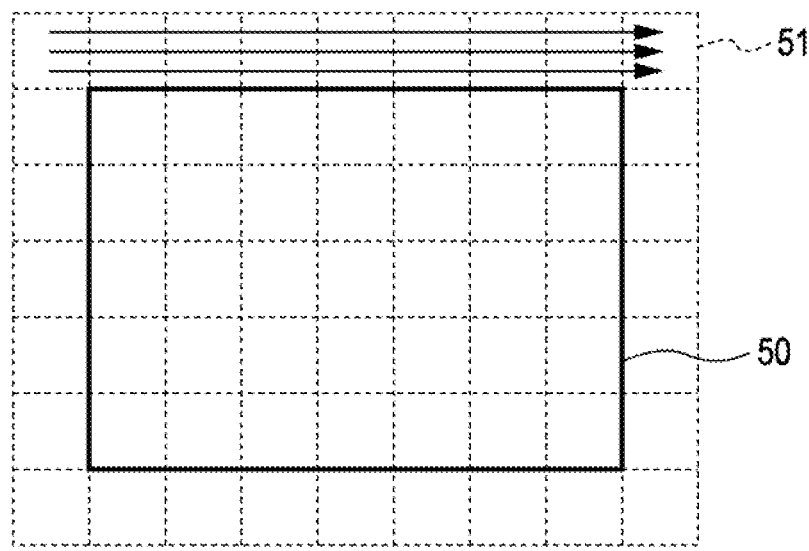
FIGS. 36A and 36B are diagrams showing a process for generating a moving-average image according to a modification.
Figure 36B:
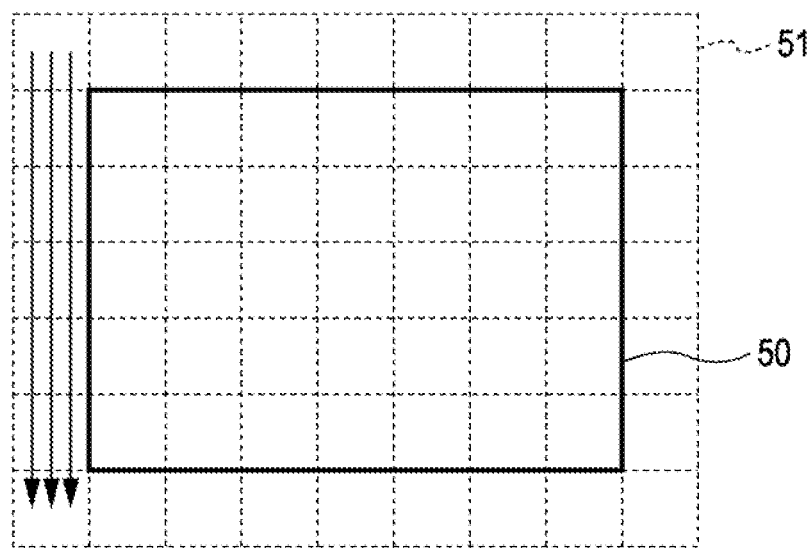
Figure 37A:
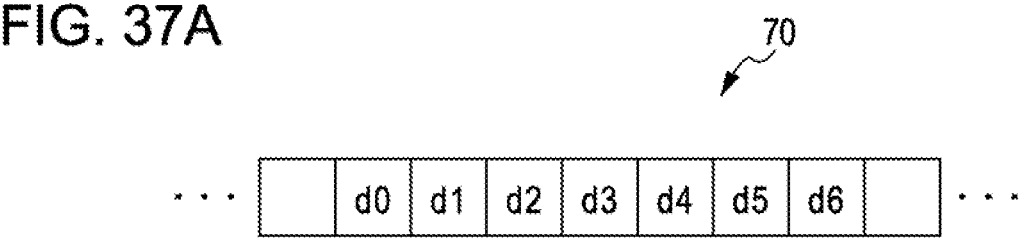
FIGS. 37A and 37B are diagrams showing a process for generating a moving-average image according to a modification.
Figure 37B:
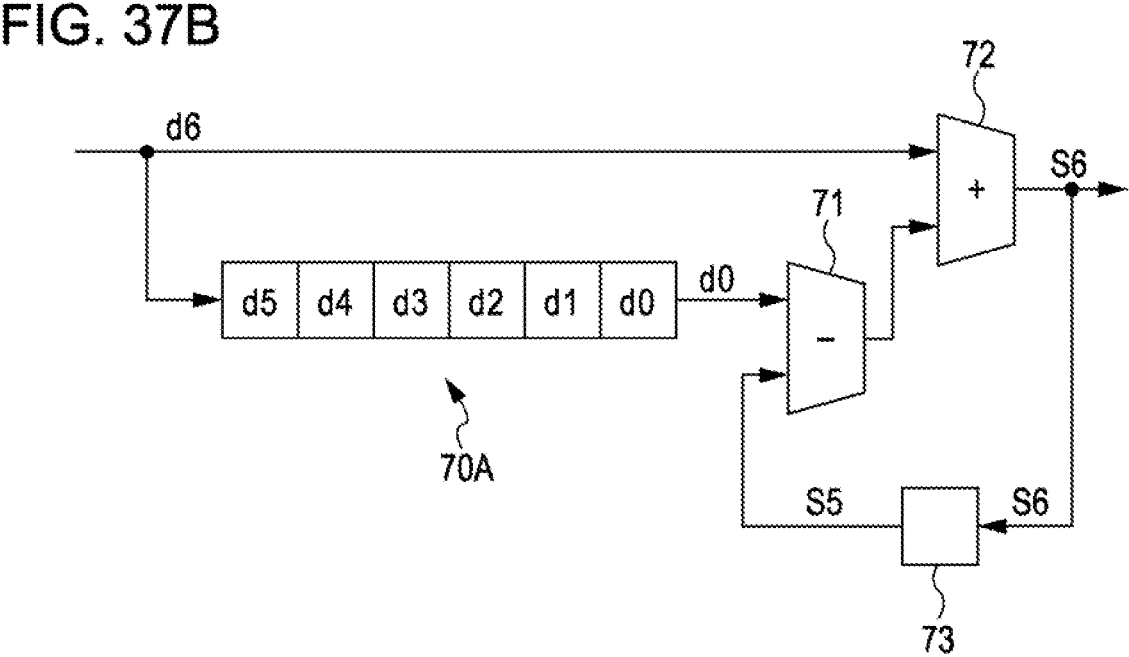

For example, in a process for generating a moving-average image according to an embodiment, when the averaging image processing is performed, the calculation may be performed by thinning out target pixels to reduce the processing load. For example, as shown in FIGS. 36A and 36B, a target pixel may be sequentially shifted in a first pixel direction to perform an averaging calculation only on pixels on the first pixel direction, and then, the target pixel may be sequentially shifted in a second pixel direction to perform an averaging calculation only on pixels on the second pixel direction. Alternatively, for example, as shown in FIGS. 37A and 37B, calculation circuits 70, 70A, 72, and 73 may be used to perform dot addition in a predetermined direction.

In the above-described embodiments, the moving-average image MA is generated from the original image A. Further, the size of the pixel region 50 used in the moving average calculation process is determined on the basis of a predicted size (target size a) of the object to be detected, thereby removing a portion in the moving-average image MA larger than the pixel region 50, i.e., a portion having a higher spatial frequency than the pixel region 50 (in this case, the fist image). Then, the difference between the moving-average image MA and the original image A is determined to remove a portion having a lower spatial frequency than the pixel region 50 (in this case, the shadow image), and finally only a portion having a high spatial frequency (in this case, the fingertip image) is extracted. In the above-described embodiments, therefore, the method for determining the difference between the moving-average image MA and the original image A is used as the easiest, most rapid exemplary method based on such a high-pass filter. The present application is not limited to the method described in the above-described embodiments, and alternatively, a high-pass filter can be used to perform both the low-pass filtering operation and the subtraction operation at the same time.

Figure 38:
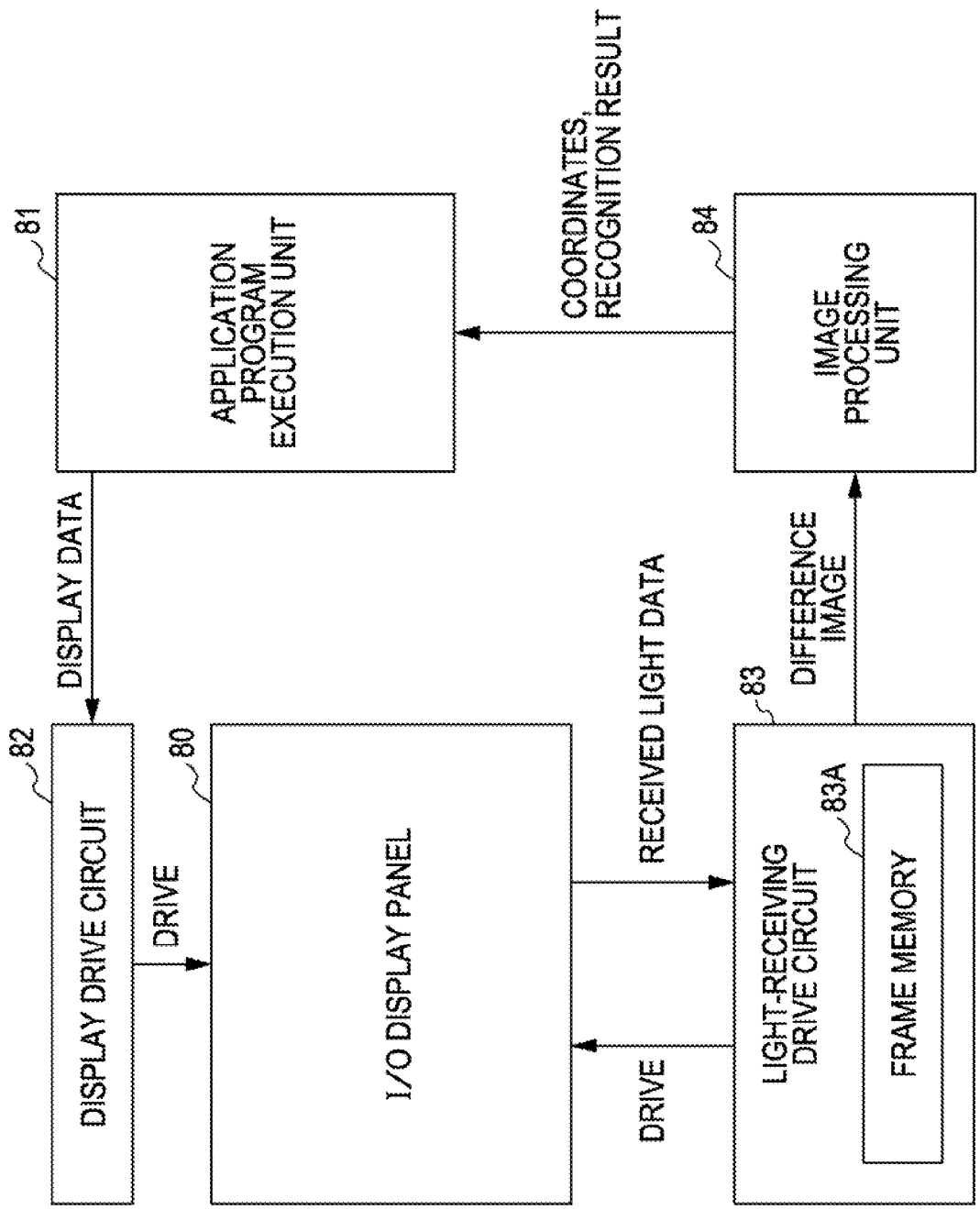
FIG. 38 is a block diagram showing an imaging and display apparatus according to a modification.
Figure 39:
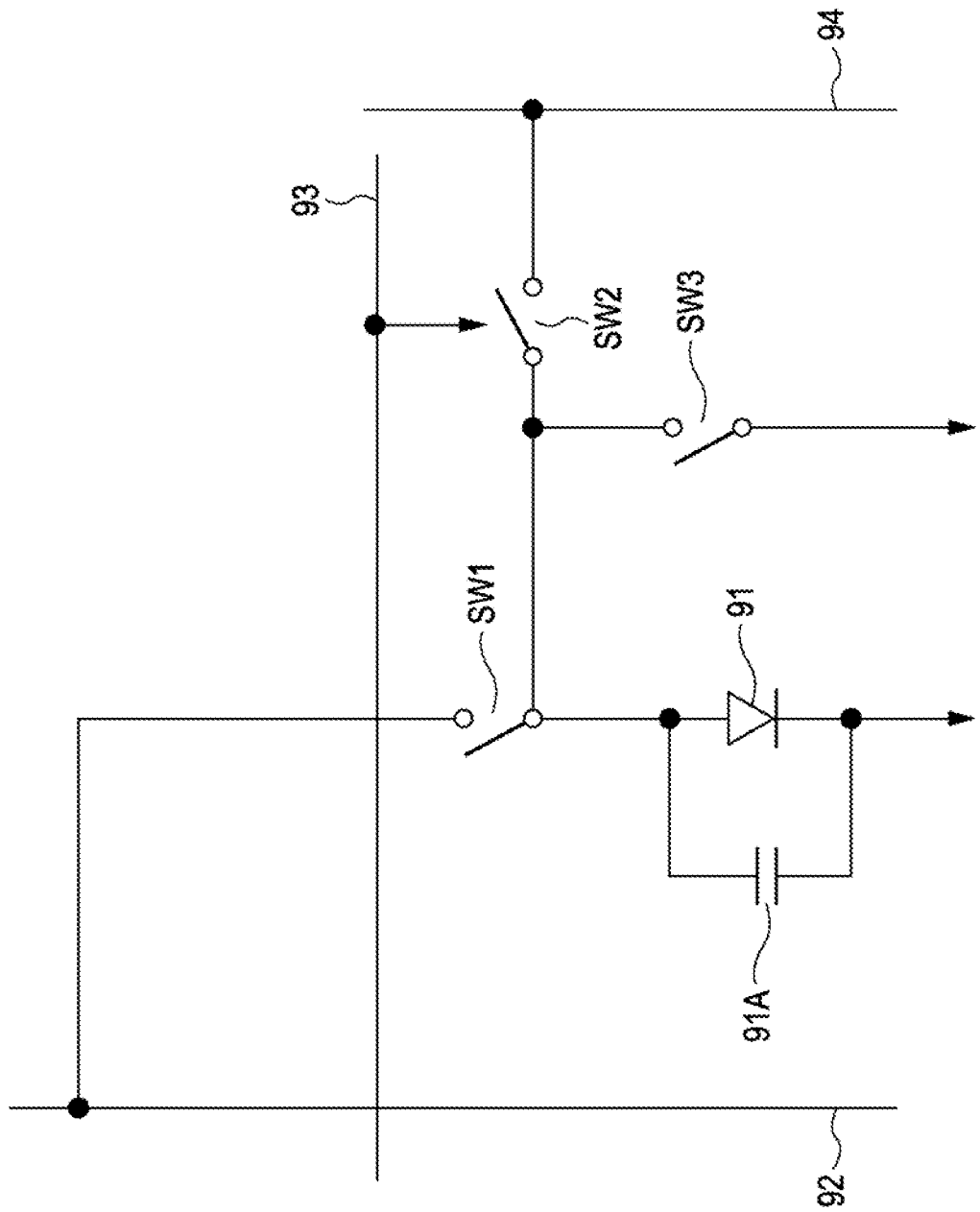
FIG. 39 is a circuit diagram showing an example structure of each pixel in the imaging and display apparatus shown in FIG. 38.

In the above-described embodiments, furthermore, the I/O display panel 20 is configured such that display elements implemented by liquid crystal elements and light-receiving elements are separately provided. For example, as shown in FIGS. 38 and 39, an imaging and display apparatus may include an I/O display panel (I/O display panel 80) formed of light-emitting light-receiving elements (imaging-and-display elements) capable of performing a light-emitting operation and a light-receiving operation in a time-division manner, such as organic electroluminescent (EL) elements. This structure can also achieve advantages similar to those of the above-described embodiments. In this structure, the period during which no display light is emitted is a period during which the imaging-and-display elements do not perform a light-emitting operation.

While the above-described embodiments have been described in the context of an imaging and display apparatus including an I/O display panel (imaging-and-display panel) having a display function and an imaging function, an information input apparatus including a display panel (imaging panel) having only an imaging function also falls within the scope of the present application. A shadow image obtained by imaging a shadow of a close object using the imaging panel can be used to detect information concerning at least one of the position, shape, and size of the close object.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging and display apparatus comprising:
    an imaging-and-display panel having an image display function and an imaging function;
    a backlight;
    a processor; and
    a memory device storing instructions which when executed by the processor cause the processor to operate with the imaging-and-display panel to:
    (a) obtain a display-light-based image by imaging an object close to the imaging-and-display panel during a light-emission period when the backlight is turned on;
    (b) obtain a shadow image by imaging the object during a non-light-emission period when the backlight is turned off;
    (c) generate a difference image representing a difference between the display-light-based image and the shadow image; and (d) obtain information concerning at least one of a position, shape, and size of the object taking the shadow image and the difference image into account.

2. The imaging and display apparatus of claim 1, wherein one operating cycle includes the non-light-emission period and the light-emission period, and in one operating cycle, the shadow image is obtained before the display-light-based image is obtained.

3. The imaging and display apparatus of claim 1, wherein the instructions, when executed by the processor, cause the processor to, in response to a failure to obtain the information concerning at least one of the position, shape, and size of the object based on the difference image, obtain the information concerning at least one of the position, shape, and size of the object based on the shadow image and independent of the difference image.

4. The imaging and display apparatus of claim 1, wherein the instructions, when executed by the processor, cause the processor to:
(a) select one of the shadow image and the difference image according to a predetermined index; and
(b) obtain the information concerning at least one of the position, shape, and size of the object based on the selected image.

5. The imaging and display apparatus of claim 4, wherein the instructions, when executed by the processor, cause the processor to, in response to a black image being displayed on the imaging-and-display panel, obtain the information concerning at least one of the position, shape, and size of the object based on the shadow image.

6. The imaging and display apparatus of claim 4, wherein the instructions, when executed by the processor, cause the processor to:
(a) determine whether the imaging and display apparatus is in a dark environment based on the shadow image; and
(b) in response to the imaging and display apparatus being in the dark environment, obtain the information concerning at least one of the position, shape, and size of the object based on the difference image.

7. The imaging and display apparatus of claim 1, wherein the instructions, when executed by the processor, cause the processor to obtain the information concerning at least one of the position, shape, and size of the object using a composite image generated by combining the shadow image and the difference image.

8. The imaging and display apparatus of claim 1, wherein the instructions, when executed by the processor, cause the processor to:
(a) generate a moving-average image of the shadow image; and
(b) obtain the information concerning at least one of the position, shape, and size of the object using the moving-average image.

9. The imaging and display apparatus of claim 8, wherein:
(a) the shadow image includes a plurality of pixel data items; and
(b) the instructions, when executed by the processor, cause the processor to generate the moving-average image based on the shadow image by:
 (i) performing an averaging calculation of pixel data items in a pixel region of the shadow image, the pixel region including a target pixel and pixels surrounding the target pixel; and
 (ii) sequentially shifting from the target pixel to a next target pixel while reflecting a result of the averaging calculation performed in the pixel region in an averaging calculation to be performed in a pixel region including the next target pixel so that the averaging calculation is performed over the entirety of the shadow image.

10. The imaging and display apparatus of claim 9, wherein the instructions, when executed by the processor, cause the processor to determine the size of the pixel region used for the averaging calculation based on the size of the object.

11. The imaging and display apparatus of claim 9, wherein the instructions, when executed by the processor, cause the processor to perform the averaging calculation by thinning out a pixel to be subjected to the averaging calculation.

12. The imaging and display apparatus of claim 8, wherein the instructions, when executed by the processor, cause the processor to obtain the information concerning at least one of the position, shape, and size of the object using a difference image representing a difference between the moving-average image and the shadow image.

13. The imaging and display apparatus of claim 1, wherein the instructions, when executed by the processor, cause the processor to obtain the information concerning at least one of the position, shape, and size of each of a plurality of objects close to the imaging-and-display panel that are simultaneously positioned on the imaging-and-display panel.

14. The imaging and display apparatus of claim 1, wherein the obtained information concerning at least one of the position, shape, and size of the object is displayed by the imaging-and-display panel.

15. The imaging and display apparatus of claim 1, wherein:
(a) the backlight includes a plurality of imaging-and-display elements capable of performing a light-emission operation and a light-receiving operation in a time-division manner; and
(b) the non-light-emission period when the shadow image is obtained is a period during which the imaging-and-display elements do not perform a light-emitting operation.

16. The imaging and display apparatus of claim 15, wherein each of the imaging-and-display elements comprises an organic electroluminescent element.

17. A non-transitory computer-readable medium storing instructions structured to cause a computer to:
(a) image, by an imaging-and-display panel including a backlight and having an image display function and an imaging function, an object close to the imaging-and-display panel during a non-light-emission period when the backlight is turned off;
(b) image, by the imaging-and-display panel, the object during a light-emission period when the backlight is turned on;
(c) generate a difference image representing a difference between a display-light-based image obtained in the second imaging step and a shadow image obtained in the first imaging step; and
(d) detect information concerning at least one of a position, shape, and size of the object taking the shadow image and the difference image into account.

18. An object detection method comprising:
(a) by an imaging-and-display panel including a backlight and having an image display function and an imaging function, obtaining a shadow image by imaging an object during a non-light-emission period when the backlight in is turned off;
(b) by the imaging-and-display panel, obtaining a display-light-based image by imaging the object during a light-emission period when the backlight is turned on;

(c) generating a difference image representing a difference between the obtained display-light-based image and the obtained shadow image; and
(d) detecting information concerning at least one of a position, shape, and size of the object taking the shadow image and the difference image into account.

19. An imaging and display apparatus comprising:
an imaging-and-display panel having an image display function and an imaging function;
a generation unit that generates a difference image representing a difference between a display-light-based image and a shadow image, the display-light-based image being obtained by the imaging-and-display panel by imaging an object close to the imaging-and-display panel during a light-emission period when the backlight in the imaging-and-display panel is turned on, the shadow image being obtained by the imaging-and-display panel by imaging the object during a non-light-emission period when the backlight is turned off; and
an image processing unit that obtains information concerning at least one of a position, shape, and size of the object taking the shadow image and the difference image into account.

20. The imaging and display apparatus of claim 1, wherein the imaging-and-display panel includes at least one sensor used to obtain both of the display-light-based image and the shadow image.

* * * * *